(12) United States Patent
Watanabe et al.

(10) Patent No.: US 9,018,129 B2
(45) Date of Patent: Apr. 28, 2015

(54) EXHAUST GAS PURIFYING CATALYST AND PRODUCTION PROCESS THEREOF

(71) Applicants: Masao Watanabe, Susono (JP); Oji Kuno, Susono (JP); Nobusuke Kabashima, Susono (JP); Keisuke Kishita, Nagoya (JP); Noboru Otake, Toyota (JP); Hiromochi Tanaka, Toyota (JP)

(72) Inventors: Masao Watanabe, Susono (JP); Oji Kuno, Susono (JP); Nobusuke Kabashima, Susono (JP); Keisuke Kishita, Nagoya (JP); Noboru Otake, Toyota (JP); Hiromochi Tanaka, Toyota (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 0 days.

(21) Appl. No.: 14/104,094

(22) Filed: Dec. 12, 2013

(65) Prior Publication Data

US 2014/0141966 A1 May 22, 2014

Related U.S. Application Data

(62) Division of application No. 13/382,552, filed as application No. PCT/JP2010/062024 on Jul. 9, 2010.

(30) Foreign Application Priority Data

Jul. 9, 2009 (JP) .................. 2009-163107

(51) Int. Cl.
*B01J 31/00* (2006.01)
*B01J 37/00* (2006.01)
(Continued)

(52) U.S. Cl.
CPC .............. *B01J 23/63* (2013.01); *B01D 53/945* (2013.01); *B01D 2255/1021* (2013.01);
(Continued)

(58) Field of Classification Search
USPC ......... 502/104, 150, 261, 262, 326–328, 330, 502/332–334, 339–341, 344, 439
See application file for complete search history.

(56) References Cited

U.S. PATENT DOCUMENTS

| | | | | |
|---|---|---|---|---|
| 5,755,879 | A | * | 5/1998 | Shintani et al. ............... 117/101 |
| 7,449,423 | B2 | * | 11/2008 | Zhou et al. .................... 502/104 |

(Continued)

FOREIGN PATENT DOCUMENTS

| | | |
|---|---|---|
| CN | 101204673 | 6/2008 |
| CN | 101394930 | 3/2009 |

(Continued)

OTHER PUBLICATIONS

International Search Report in International Application No. PCT/JP2010/062024; Mailing Date: Sep. 28, 2010.
(Continued)

*Primary Examiner* — Cam N. Nguyen
(74) *Attorney, Agent, or Firm* — Finnegan, Henderson, Farabow, Garrett & Dunner, LLP

(57) ABSTRACT

Disclosed is an exhaust gas purifying catalyst in which grain growth of a noble metal particle supported on a support is suppressed. Also disclosed is a production process for producing an exhaust gas purifying catalyst. The exhaust gas purifying catalyst comprises a crystalline metal oxide support and a noble metal particle supported on the support, wherein the noble metal particle is epitaxially grown on the support, and wherein the noble metal particle is dispersed and supported on the outer and inner surfaces of the support. The process for producing an exhaust gas purifying catalyst comprises masking, in a solution, at least a part of the surface of a crystalline metal oxide support by a masking agent, introducing the support into a noble metal-containing solution containing a noble metal, and drying and firing the support and the noble metal-containing solution to support the noble metal on the support.

6 Claims, 20 Drawing Sheets

: NOBLE METAL PARTICLE

: SUPPORT

(51) Int. Cl.
| | |
|---|---|
| C08F 4/02 | (2006.01) |
| C08F 4/60 | (2006.01) |
| B01J 21/00 | (2006.01) |
| B01J 21/04 | (2006.01) |
| B01J 23/02 | (2006.01) |
| B01J 23/04 | (2006.01) |
| B01J 23/06 | (2006.01) |
| B01J 23/40 | (2006.01) |
| B01J 23/42 | (2006.01) |
| B01J 23/44 | (2006.01) |
| B01J 23/58 | (2006.01) |
| B01J 23/63 | (2006.01) |
| B01D 53/94 | (2006.01) |
| B01J 35/00 | (2006.01) |
| B01J 37/02 | (2006.01) |
| B01J 37/03 | (2006.01) |
| B01J 21/06 | (2006.01) |
| B01J 23/46 | (2006.01) |
| B01J 35/04 | (2006.01) |

(52) U.S. Cl.
CPC .............. *B01D 2255/1023* (2013.01); *B01D 2255/1025* (2013.01); *B01D 2255/20715* (2013.01); *B01D 2255/402* (2013.01); *B01D 2255/407* (2013.01); *B01D 2255/9202* (2013.01); *B01J 23/40* (2013.01); B01J 35/006 (2013.01); B01J 37/0217 (2013.01); B01J 37/0219 (2013.01); *Y02T 10/22* (2013.01); B01J 37/038 (2013.01); B01J 21/066 (2013.01); B01J 23/42 (2013.01); B01J 23/464 (2013.01); *B01J 35/0013* (2013.01); B01J 35/04 (2013.01); B01J 37/0211 (2013.01)

(56) References Cited

U.S. PATENT DOCUMENTS

| | | | |
|---|---|---|---|
| 7,582,586 | B2 | 9/2009 | Fanson et al. |
| 7,632,773 | B2* | 12/2009 | Zhou et al. ............. 502/152 |
| 7,718,567 | B2 | 5/2010 | Hanaki et al. |
| 7,820,585 | B2 | 10/2010 | Hirata |
| 7,871,957 | B2* | 1/2011 | Willigan et al. ........... 502/304 |
| 2009/0092875 | A1* | 4/2009 | Daimon et al. ............. 429/30 |
| 2009/0170689 | A1 | 7/2009 | Hatanaka et al. |
| 2009/0176114 | A1* | 7/2009 | Sawabe et al. ............ 428/471 |
| 2009/0247397 | A1 | 10/2009 | Mashima et al. |

FOREIGN PATENT DOCUMENTS

| | | |
|---|---|---|
| JP | 2000-15098 | 1/2000 |
| JP | 2006-55748 | 3/2006 |
| JP | 2006-314885 | 11/2006 |
| JP | 2007-812 | 1/2007 |
| JP | 2007-105652 | 4/2007 |
| JP | 2007-289920 | 11/2007 |
| JP | 2008-55418 | 3/2008 |
| JP | 2008-229458 | 10/2008 |
| JP | 2008-279365 | 11/2008 |
| JP | 2008-308735 | 12/2008 |

OTHER PUBLICATIONS

Masayuki Fukui et al., "Tanji Rh Shokubai no Hai Gas Joka Tokusei to Jotai Kaiseki," Shokubai Toronkai Toronkai A Yokoshu, vol. 78, p. 104 (1996).
Bernal, S. et al., "Microstructural and Chemical Properties of Ceria-Supported Rhodium Catalysts Reduced at 773 K," J. Phys. Chem, 97, 1993, pp. 4118-4123.
Bernal, S., et al., "HREM study of the behavior of a Rh/CeO$_2$ catalyst under high temperature reducing and oxidizing conditions," Catalysis Today, 23, (1995), pp. 219-250.
Bernal, S. et al., "Characterisation of three-way automotive aftertreatment catalysts and related model systems," Topics in Catalysis vol. 28, Nos. 1-4, Apr. 2004, pp. 31-45.
Office Action for U.S. Appl. No. 13/382,552 dated Jan. 30, 2014.

* cited by examiner

Fig.3
(a)  (b)
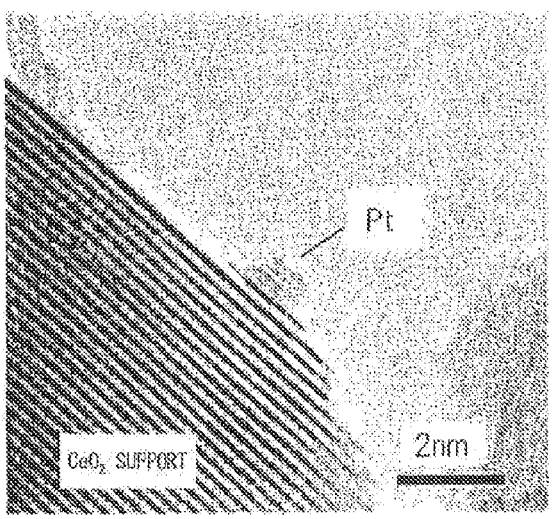 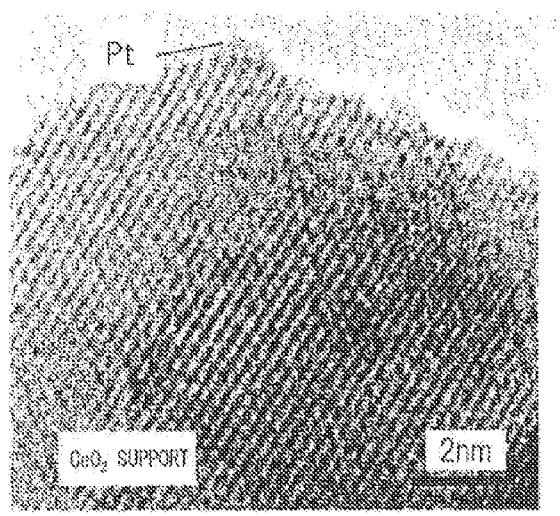

Fig. 25
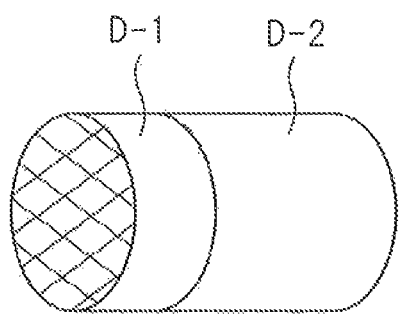
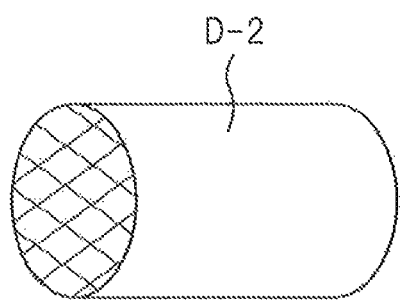
Fig. 26
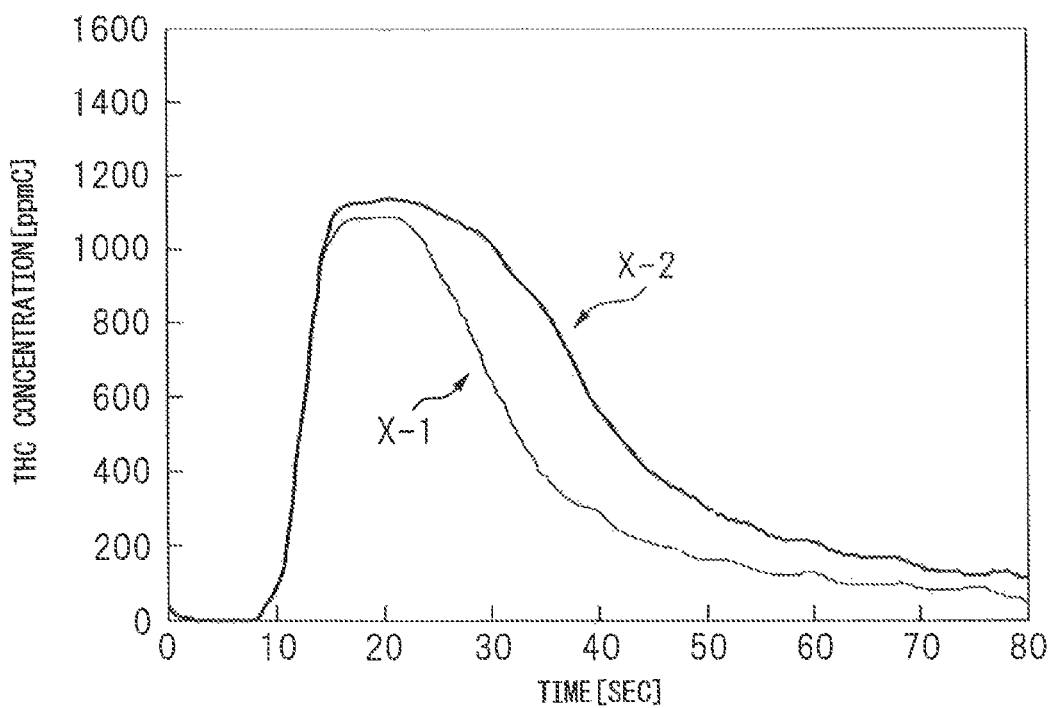

EXHAUST GAS PURIFYING CATALYST AND PRODUCTION PROCESS THEREOF

CROSS-REFERENCE TO RELATED APPLICATIONS

This is a division of application Ser. No. 13/382,552, which is a national phase of International Application No. PCT/JP2010/062024, filed Jul. 9, 2010 and claims the priority of Japanese Application No. 2009-163107, filed Jul. 9, 2009. The contents of each of these applications are incorporated herein by reference.

TECHNICAL FIELD

The present invention relates to an exhaust gas purifying catalyst and a production process thereof. More specifically, the present invention relates to an exhaust gas purifying catalyst used to purify an exhaust gas from an internal combustion engine of automobiles and the like, and a production process thereof.

BACKGROUND ART

The exhaust gas from an internal combustion engine such as automobile engine contains nitrogen oxide ($NO_x$), carbon monoxide (CO), hydrocarbon (HC) and the like. These substances can be purified by an exhaust gas purifying catalyst capable of oxidizing CO and HC and at the same time, reducing $NO_x$. As a representative exhaust gas purifying catalyst, a catalyst obtained by supporting a noble metal such as platinum, rhodium and palladium on a porous metal oxide support such as alumina is known.

A problem arising with such an exhaust gas purifying catalyst using a noble metal is a phenomenon that a noble metal particle moves on the support during use of the catalyst and a plurality of noble metal particles combine to undergo grain growth, i.e., a phenomenon called sintering of a noble metal. In this connection, Patent Document 1 proposes a technique where a perovskite-type composite oxide layer constituting a support is epitaxially grown from a noble metal layer, thereby forming firm bonding between the support composed of the perovskite-type composite oxide and the noble metal and in turn, suppressing sintering of the noble metal. Specifically, in this document, a crystalline noble metal layer is formed on a base material, an epitaxial support layer composed of a perovskite-type composite oxide is formed on the surface of the noble metal layer, and the stack of the noble metal layer and the support layer is separated from the base material to produce an exhaust gas purifying catalyst. Furthermore, this document describes that when the thus-obtained stack of the noble metal layer and the support layer is pulverized, a powdery exhaust gas purifying catalyst consisting of a support layer with a size of 10 to 20 nm and a catalyst layer with a size of 1 to 2 nm supported on the support layer is obtained. In this method, a powdery exhaust gas purifying catalyst is obtained by pulverizing the stack of the noble metal layer and the support layer, and therefore in the obtained exhaust gas purifying catalyst, the noble metal is supported only on the outer surface of the support.

In the exhaust gas purifying catalyst using a noble metal, it is generally preferred for the purification of an exhaust gas to highly disperse and support a noble metal on a support and thereby increase the surface area of the noble metal. However, as in exhaust gas purifying catalyst 10$a$ shown in FIG. 6($a$), when individual noble metal particles 12$a$ initially supported on support 11 are very small, for example, at the atom level, there are the problems that noble metal particles are aggregated in an uncontrollable level during use of the catalyst to undergo grain growth and that the noble metal in a relatively oxidized state is present on the support and the catalytic activity is thereby not sufficiently obtained.

In order to solve these problems due to noble metal particles that are too small, it is known to support noble metal particles having a controlled size on a support (Patent Documents 2 to 4).

With respect to the size control of the noble metal particle, it is known to form a noble metal colloid having a controlled size in a solution and thereafter, support the noble metal colloid on a support. However, as shown in FIG. 6($b$), conventional exhaust gas purifying catalyst 10$b$ obtained using a noble metal colloid has a problem that noble metal particle 12$b$ formed from the noble metal colloid is not fixed on the support 11, and therefore during use of the exhaust gas purifying catalyst, the noble metal particle 12$b$ moves on the surface of support 11 and undergoes grain growth.

In this connection, in Patent Document 4, as shown in FIG. 6($c$), noble metal particle 12$c$ formed from a noble metal colloid is partially buried in support 11, thereby preventing the problem that during use of exhaust gas purifying catalyst 10$c$, the noble metal particle 12$c$ moves on the surface of the support 11 and undergoes grain growth. However, in this method, the portion in the noble metal buried in the support 11 cannot contact with an exhaust gas and is wasted because of no action as an active site, and therefore the noble metal must be used in a relatively large amount.

Here, in order to prevent the noble metal particle from moving on the support surface to undergo grain growth during use of the exhaust gas purifying catalyst, it is also known to utilize chemical affinity between the support and the noble metal supported on the support. In this regard, for example, Patent Document 5 proposes a technique where the noble metal is bonded with a cation in the support through oxygen on the support surface to form a surface oxide layer, thereby inhibiting grain growth of the noble metal, and describes particularly a cation having an electronegativity smaller than that of zirconium as the cation.

Incidentally, Patent Document 6 proposes that taking into consideration the fact that in an exhaust gas purifying catalyst, a three-phase interface among an exhaust gas, a noble metal fine particle and a support particle efficiently functions in terms of purification of the exhaust gas, in order to increase the three-phase interface, noble metal ions are made to collide against the support by the Lorenz force and the coulomb force using a vacuum arc deposition apparatus and are deposited and aggregated on the support, thereby producing a generally hemispherical noble metal particle on the support.

As in Patent Document 6, in the case of depositing a noble metal particle on a support using a vacuum arc deposition apparatus, it is difficult to control the particle diameter of the noble metal. Furthermore, although the noble metal particle can be deposited on the outer surface of the support, it is difficult to deposit the noble metal particle on the inside surface of the support, i.e., the surface incapable of being directly observed from outside the support, for example, the surface in a pore. Furthermore, in the production process of an exhaust gas purifying catalyst using a vacuum arc deposition apparatus, it is difficult to produce an exhaust gas purifying catalyst at a practical speed.

RELATED ART

Patent Document 1: Japanese Unexamined Patent Publication (Kokai) No. 2008-279365
Patent Document 2: Japanese Unexamined Patent Publication (Kokai) No. 2006-314885
Patent Document 3: Japanese Unexamined Patent Publication (Kokai) No. 2008-55418
Patent Document 4: Japanese Unexamined Patent Publication (Kokai) No. 2007-812
Patent Document 5: Japanese Unexamined Patent Publication (Kokai) No. 2007-289920
Patent Document 6: Japanese Unexamined Patent Publication (Kokai) No. 2008-308735

SUMMARY OF THE INVENTION

Problems to be Solved by the Invention

The present invention provides an exhaust gas purifying catalyst in which grain growth of a noble metal particle supported on a support is suppressed. Also, the present invention provides a production process of an exhaust gas purifying catalyst, by which the above exhaust gas purifying catalyst can be produced.

Furthermore, the present invention provides an exhaust gas purifying catalyst ensuring that the grain growth of a noble metal particle supported on a support is suppressed, the activity of the noble metal particle during use thereof is high, and the amount of the noble metal used can be relatively small. In addition, the present invention provides a production process of an exhaust gas purifying catalyst, by which the above exhaust gas purifying catalyst can be produced.

Means for Solving the Problems

The present inventors have found that when a noble metal particle is epitaxially grown on a crystalline metal oxide support and is dispersed and supported on the outer and inner surfaces of the support, and particularly, a noble metal particle having a controlled size is supported in a generally hemispherical shape on a support, the above-described problems can be solved. The present invention described below has been conceived of based on this finding.

<1> An exhaust gas purifying catalyst comprising:
a crystalline metal oxide support and a noble metal particle supported on the support,
wherein the noble metal particle is epitaxially grown on the support, and
wherein the noble metal particle is dispersed and supported on the outer and inner surfaces of the support.

<2> The exhaust gas purifying catalyst as described in item <1>, wherein the noble metal particle is supported in a generally hemispherical shape on the support,
wherein the width (W) of the portion of contact between the support and the noble metal particle and the height (H) of the noble metal particle from the surface of the support satisfy the following formula (1):

$$W/H > 1.0 \tag{1}$$

and
wherein the height (H) of the noble metal particle from the surface of the support is 0.5 nm or more.

<3> The exhaust gas purifying catalyst as described in item <1> or <2>, wherein the height (H) of the noble metal particle from the surface of the support is 10.0 nm or less.

<4> The exhaust gas purifying catalyst as described in any one of items <1> to <3>, wherein the particle diameter of the noble metal particle as measured by a carbon monoxide adsorption method is from 0.5 to 10 nm.

<5> The exhaust gas purifying catalyst as described in any one of items <1> to <4>, wherein the noble metal is selected from the group consisting of platinum, palladium, rhodium and a combination thereof.

<6> The exhaust gas purifying catalyst as described in any one of items <1> to <5>, wherein the support is selected from the group consisting of ceria, zirconia, a ceria-zirconia solid solution, a perovskite-type metal oxide, titania and a combination thereof.

<7> The exhaust gas purifying catalyst as described in any one of items <1> to <6>, wherein the support is a metal oxide support containing a metal element selected from the group consisting of an alkali metal, an alkaline earth metal, a rare earth and a combination thereof.

<8> The exhaust gas purifying catalyst as described in any one of items <1> to <7>, wherein the height (H) of the noble metal particle from the surface of the support is 5.0 nm or less.

<9> The exhaust gas purifying catalyst as described in any one of items <1> to <8>, wherein after the catalyst is subjected to endurance at 800° C. for 5 hours by switching the atmosphere between the following rich and lean atmospheres every two minutes, the distribution of the noble metal particle has a full width at half maximum of 3.0 nm or less:
Rich atmosphere: CO-3%, $H_2O$-5%, $N_2$-balance,
Lean atmosphere: $O_2$-5%, $H_2$-5%, $N_2$-balance.

<10> The exhaust gas purifying catalyst as described in item <1>, wherein the noble metal particle is supported in a generally hemispherical shape on the support,
wherein the width (W) of the portion of contact between the support and the noble metal particle and the height (H) of the noble metal particle from the surface of the support satisfy the following formula (1):

$$W/H > 1.0 \tag{1}$$

wherein the height (H) of the noble metal particle from the surface of the support is from 0.5 to 10 nm,
wherein the noble metal particle is platinum, and
wherein the support is ceria or a ceria-zirconia solid solution.

<11> The exhaust gas purifying catalyst as described in item <10>, wherein the particle diameter of the noble metal particle as measured by a carbon monoxide adsorption method is from 1.0 to 5.0 nm.

<12> The exhaust gas purifying catalyst as described in item <1>, wherein the noble metal particle is supported in a generally hemispherical shape on the support,
wherein the width (W) of the portion of contact between the support and the noble metal particle and the height (H) of the noble metal particle from the surface of the support satisfy the following formula (1):

$$W/H > 1.0 \tag{1}$$

wherein the height (H) of the noble metal particle from the surface of the support is from 2 to 5 nm,
wherein the noble metal particle is rhodium, and
wherein the support is ceria or a ceria-zirconia solid solution.

<13> The exhaust gas purifying catalyst as described in item <12>, wherein the noble metal particle and the support have a crystal plane bonding of (111) planes or (200) planes to each other.

<14> An exhaust gas purifying device comprising a base material and exhaust gas purifying catalysts held on the base material, wherein out of the exhaust gas purifying catalysts held on the base material, the exhaust gas purifying catalyst supported on the exhaust gas flow upstream side of the base material is the exhaust gas purifying catalyst as described in any one of items <1> to <13>.

<15> The exhaust gas purifying device as described in item <14>, wherein the base material is a honeycomb base material.

<16> A process for producing an exhaust gas purifying catalyst, comprising:

masking, in a solution, at least a part of the surface of a crystalline metal oxide support by a masking agent, introducing the support with at least a part of the surface being masked by a masking agent, into a noble metal-containing solution containing a noble metal, and drying and firing the support and the noble metal-containing solution to support the noble metal on the support.

<17> The process as described in item <16>, wherein the masking agent has a functional group selected from the group consisting of a secondary amine group, a tertiary amine group, a carboxyl group, a hydroxyl group, a carbonyl group and a combination thereof.

<18> The process as described in item <1.6> or <17>, wherein the noble metal-containing solution is a noble metal aggregate-containing solution containing a partially reduced and aggregated noble metal aggregate, and wherein the noble metal aggregate-containing solution is obtained by providing a raw material solution containing a noble metal ion and/or complex and a polymer, coordinating the noble metal ion and/or complex to the polymer, and partially reducing and aggregating the noble metal ion and/or complex coordinated to the polymer.

<19> The process as described in any one of items <16> to <18>, wherein the partial reduction and aggregation are performed by heating, addition of a reducing agent, or a combination thereof.

<20> The process as described in any one of items <16> to <19>, wherein the polymer has a functional group selected from the group consisting of a secondary amine group, a tertiary amine group, a carboxyl group, a hydroxyl group, a carbonyl group and a combination thereof.

<21> The process as described in any one of items <16> to <20>, wherein the noble metal is selected from the group consisting of platinum, palladium, rhodium and a combination thereof.

<22> The process as described in any one of items <16> to <21>, wherein the support is a metal oxide support containing a metal element selected from the group consisting of an alkali metal, an alkaline earth metal, a rare earth and a combination thereof.

<23> An exhaust gas purifying catalyst produced by the process as described in any one of items <16> to <22>.

BRIEF DESCRIPTION OF THE DRAWINGS

FIG. 3 shows TEM photographs of (a) Exhaust Gas Purifying Catalyst A-1 obtained using a masking agent and (b) Exhaust Gas Purifying Catalyst A-2 obtained without using a masking agent (Example 1).

FIG. 25 is a view showing the configurations of (a) Catalyst Device X-1 of the present invention and (b) conventional Catalyst Device X-2 (Example 4 <Evaluation 2>).

FIG. 26 is a view showing the total hydrocarbon (THC) concentration of the outgoing gas when Catalyst Device X-1 of the present invention or conventional Catalyst Device X-2 is used (Example 4 <Evaluation 2>).

MODE FOR CARRYING OUT THE INVENTION

Exhaust Gas Purifying Catalyst

The exhaust gas purifying catalyst of the present invention comprises a crystalline metal oxide support and a noble metal particle supported on the support, wherein the noble metal particle is epitaxially grown on the crystalline metal oxide support. Particularly, in the exhaust gas purifying catalyst of the present invention, the noble metal particle is epitaxially grown in the crystal terrace region of the crystalline metal oxide support.

According to the exhaust gas purifying catalyst of the present invention, the noble metal particle is epitaxially grown on the crystalline metal oxide support, so that the noble metal particle can be inhibited from moving and in turn sintering during use of the catalyst. Accordingly, the exhaust gas purifying catalyst of the present invention can maintain high catalytic activity, for example, high catalytic activity at low temperatures, even after endurance.

Figure 1:
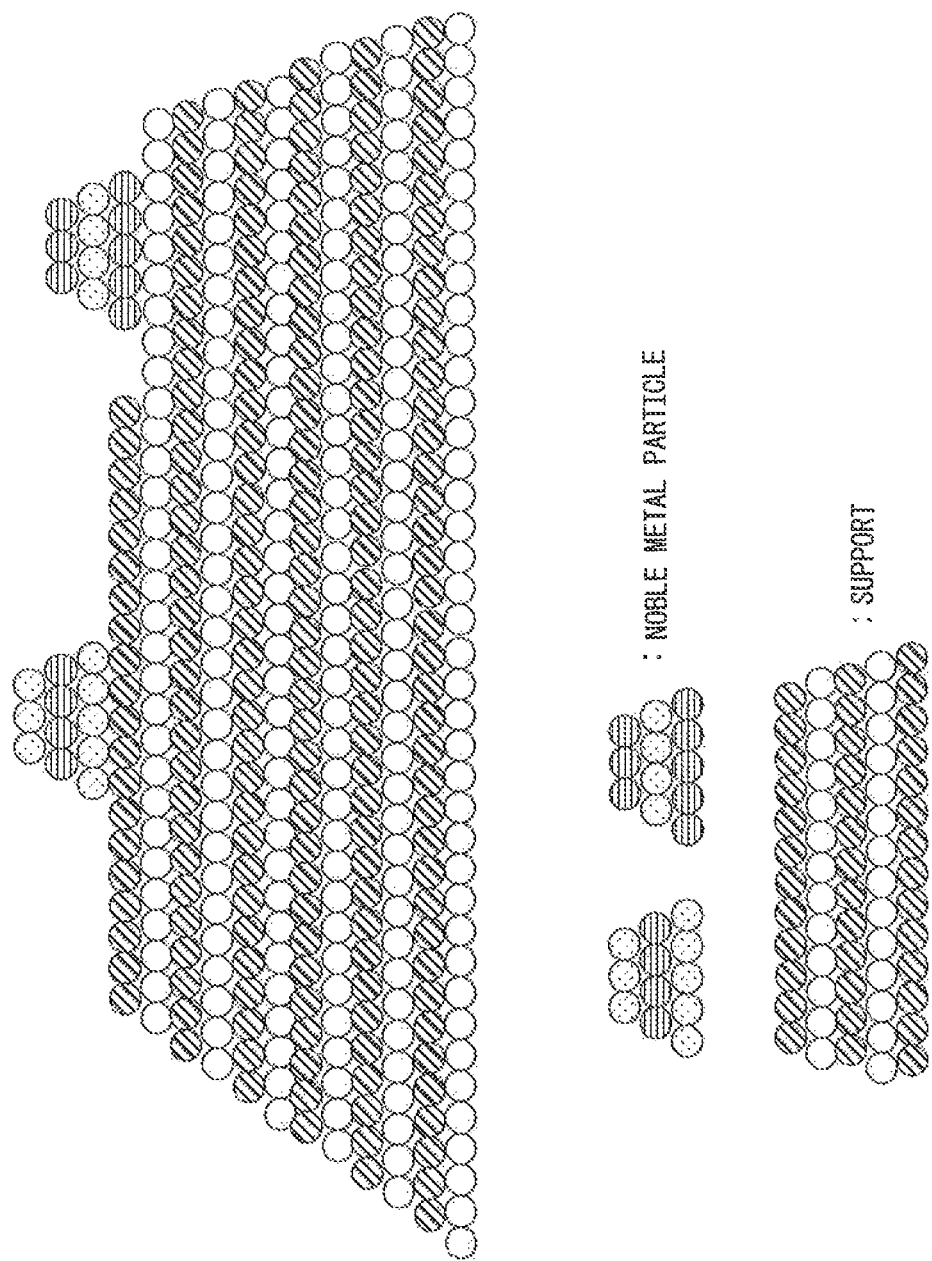
FIG. 1 is a conceptual cross-sectional view of the exhaust gas purifying catalyst of the present invention.

The state where the noble metal particle is epitaxially grown in the crystal terrace region (relatively flat region on the crystal surface) of the crystalline metal oxide support is, for example, the state shown in FIG. 1. In FIG. 1, four kinds of circles (○) indicate individual atoms, and the perfect array of the circles in the metal oxide support and noble metal particle means that the metal oxide support and noble metal particle have specific crystallinity. Also, the same striped pattern formed between the metal oxide support and the noble metal particle indicates that the noble metal particle is supported on the crystalline metal oxide support to develop the same crystal orientation, i.e., the noble metal particle is epitaxially grown on the metal oxide support.

Figure 2:
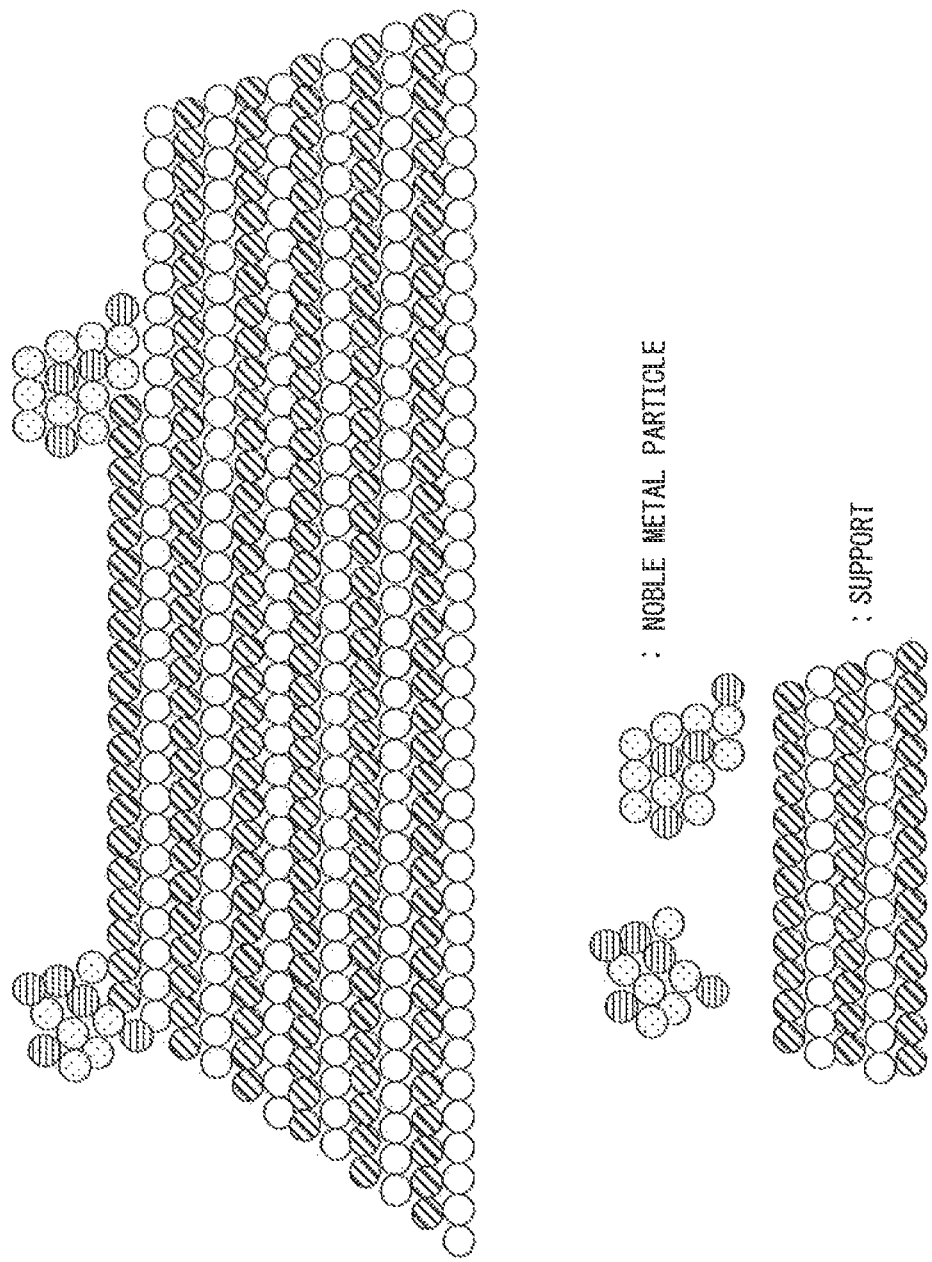
FIG. 2 is a conceptual cross-sectional view of the conventional exhaust gas purifying catalyst.

On the other hand, FIG. 2 shows the state where the noble metal particle is not epitaxially grown on the crystalline metal oxide support, i.e., the noble metal particle is not supported on the crystalline metal oxide support to develop the same crystal orientation. In the exhaust gas purifying catalyst shown in FIG. 2, the noble metal crystal is supported in the edge region (crystal edge region) and step region (stepped region of atomic monolayer) of the crystal.

In the present invention, whether the noble metal particle is epitaxially grown on the support can be known by the observation through a transmission electron microscope (TEM). However, in the present invention, the noble metal particle being epitaxially grown on the support does not mean that all noble metal particles are epitaxially grown on the crystalline metal oxide support, but means that with respect to at least a part, for example, at least 10%, at least 30%, at least 50%, at least 70%, or substantially all (in terms of area by the TEM photograph) of noble metal particles, the epitaxial growth of which can be judged when observed through TEM, the noble metal particle is epitaxially grown on the crystalline metal oxide support.

Also, in the case of producing the exhaust gas purifying catalyst of the present invention by the process of the present invention, the noble metal particle being epitaxially grown on the support in the present invention means that the noble metal particle is preferentially epitaxially grown on the support, i.e., the ratio of the noble metal particle epitaxially grown on the support is large, compared with the case of not using the process of the present invention, i.e., the case of not masking at least a part of the surface of the support by a masking agent.

In the exhaust gas purifying catalyst of the present invention, the noble metal particle is dispersed and supported on not only the outer surface of the support but also the inner surface thereof. According to this configuration, compared with the case where the noble metal particle is supported on only the outer surface of the support, the distance between noble metal particles can be broadened, and therefore sintering of the noble metal particle can be further suppressed. The term "outer surface of the support" as used herein means the surface directly exposed to the outside of the support, and the term "inner surface of the support" means the surface not directly exposed to the outside of the support, i.e., the inside of a pore or when the support is composed of a secondary particle, the gap between primary particles, etc.

<Exhaust Gas Purifying Catalyst—Noble Metal>

The noble metal which can be used in the exhaust gas purifying catalyst of the present invention may be any noble metal, and in particular, platinum, palladium, rhodium or a combination thereof is preferred in view of exhaust gas purifying performance.

<Exhaust Gas Purifying Catalyst—Support>

The support which can be used in the exhaust gas purifying catalyst of the present invention may be a crystalline metal oxide support, in particular a powdery crystalline metal oxide support. The support includes, for example, a support selected from the group consisting of ceria, zirconia, a ceria-zirconia solid solution, a perovskite-type metal oxide, titania and a combination thereof.

The metal oxide support is preferably a support capable of attracting a noble metal due to affinity for the noble metal supported on the support and thereby inhibiting the noble metal particle from moving. Accordingly, the metal oxide support is preferably the metal oxide support described in Patent Document 5, i.e., a support where the cation of at least one metal element out of metal elements constituting the metal oxide support has an electronegativity smaller than that of zirconium cation. Specifically, as this support, a support containing a metal element selected from the group consisting of an alkali metal such as lithium, sodium and potassium; an alkaline earth metal such as calcium and barium; a rare earth such as yttrium and cerium; and a combination thereof is preferably used. In particular, a metal oxide support containing cerium, i.e., a cerium-based support such as ceria or ceria-zirconia composite oxide is preferably used as the metal oxide support. In the case of using such a metal oxide support, as described in Patent Document 5, the noble metal is bonded with the cation of the support through oxygen on the support surface to form a surface oxide layer, whereby the grain growth of the noble metal can be suppressed.

<Exhaust Gas Purifying Catalyst—Embodiment Where Shape and Size of Noble Metal Particle are Controlled>

In one embodiment of the exhaust gas purifying catalyst of the present invention, the noble metal particle supported on the support has a generally hemispherical shape.

Figure 5:
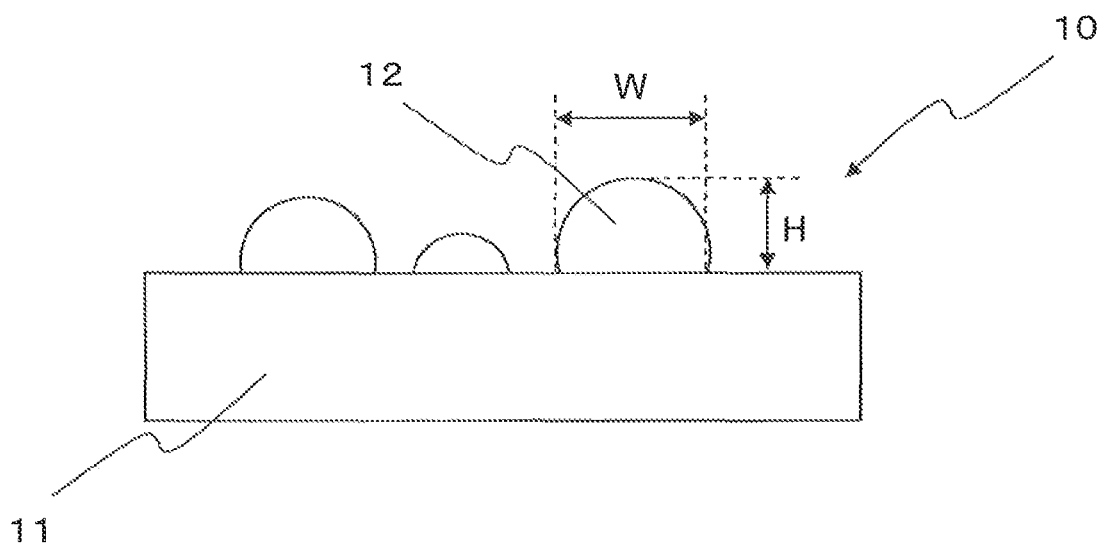
FIG. 5 is a conceptual cross-sectional view of the exhaust gas purifying catalyst where the shape and size of the noble metal particle are controlled.

In this embodiment, the noble metal particle is held in a generally hemispherical shape on the support, whereby the contact area between the support and the noble metal particle is increased, and therefore the movement of the noble metal particle during use of the catalyst is inhibited. Specifically, in the exhaust gas purifying catalyst of this embodiment, as shown in FIG. 5, the width (W) of the portion of contact between the support and the noble metal particle is relatively large compared with the height (H) of the noble metal particle from the surface of the support and satisfies the following formula (1):

$$W/H > 1.0, 1.1, 1.2, 1.3, 1.4, 1.5 \text{ or } 1.6 \quad (1)$$

Also, in the exhaust gas purifying catalyst of this embodiment, the height (H) of the noble metal particle from the surface of the support is 0.5 nm or more. That is, in the exhaust gas purifying catalyst of this embodiment, the noble metal particle is not supported in a single atom state on the support, but is present as a particle having a certain level of size. In the exhaust gas purifying catalyst, it is preferable to support the noble metal particle having a controlled size on the support, in order to inhibit the noble metal particle from undergoing grain growth to an uncontrollable extent during use of the catalyst and allow the noble metal to be present in a metallic state on the support.

In this connection, in the exhaust gas purifying catalyst of the present invention, the height (H) of the noble metal particle from the surface of the support may be 0.5 nm or more, 0.6 nm or more, 0.8 nm or more, 1.0 nm or more, or 2.0 nm or more. Also, in the exhaust gas purifying catalyst of the present invention, the height (H) of the noble metal particle from the surface of the support may be 10.0 nm or less, 8.0 nm or less, 6.0 nm or less, 5.0 nm or less, 4.0 nm or less, 3.0 nm or less, or 2.0 nm or less.

Incidentally, in the present invention, the width (W) of the portion of contact between the support and the noble metal particle and the height (H) of the noble metal particle from the surface of the support are values which can be obtained by the observation through a transmission electron microscope (TEM). However, in the present invention, these values are not meant to be satisfied by all of the noble metal particles, but are meant to be satisfied by at least a part, for example, at least 10%, at least 30%, at least 50%, at least 70%, or substantially all (in terms of area by the TEM photograph) of the noble metal particles, the values of which can be measured when observed through TEM.

When the noble metal particle having a predetermined size is supported on the support as above, this is preferred from the standpoint of, for example, inhibiting sintering of the noble metal particle during use. The size of the noble metal particle can also be expressed by the particle diameter of the noble metal particle as measured by a carbon monoxide adsorption method, and the particle diameter of the noble metal particle as measured by a carbon monoxide adsorption method is preferably from 0.5 to 10.0 nm, more preferably from 0.8 to 4.0 nm, still more preferably from 0.8 to 3.0 nm.

For example, after endurance performed at 800° C. for 5 hours by switching the atmosphere between the following rich and lean atmospheres every two minutes, the particle size distribution of the noble metal particle may have a full width at half maximum of 3.0 nm or less, 2.0 nm or less, or 1.5 nm or less:

Rich atmosphere: CO—3%, $H_2$-5%, $N_2$-balance,
Lean atmosphere: $O_2$-5%, $H_2$-5%, $N_2$-balance.

When the noble metal particle after endurance has such a narrow particle size distribution as well as a small average particle size, this may be preferred in view of catalytic activity of the exhaust gas purifying catalyst after endurance, particularly, catalytic activity at low temperatures.

<Exhaust Gas Purifying Catalyst—Specific Embodiment>

Based on the above description, the exhaust gas purifying catalyst of the present invention may have, for example, the following configuration: the noble metal particle is supported in a generally hemispherical shape on the support; the width (W) of the portion of contact between the support and the noble metal particle and the height (H) of the noble metal particle from the surface of the support satisfy the following formula (1): W/H>1.0 (1); the height (H) of the noble metal particle from the surface of the support is from 0.5 to 10 nm; the noble metal particle is platinum; and the support is ceria or a ceria-zirconia solid solution.

Also, based on the above description, the exhaust gas purifying catalyst of the present invention may have, for example, the following configuration: the noble metal particle is supported in a generally hemispherical shape on the support; the width (W) of the portion of contact between the support and the noble metal particle and the height (H) of the noble metal particle from the surface of the support satisfy the following formula (1): W/H>1.0 (1); the height (H) of the noble metal particle from the surface of the support is from 2 to 5 nm; the noble metal particle is rhodium; and the support is ceria or a ceria-zirconia solid solution. The noble metal particle and the support may have a crystal plane bonding of (111) planes or (200) planes to each other.

<Exhaust Gas Purifying Catalyst—Production Process>

Such an exhaust gas purifying catalyst of the present invention may be produced by any process, but can be produced particularly by the process of the present invention for producing an exhaust gas purifying catalyst.

<Exhaust Gas Purifying Device>

The exhaust gas purifying device of the present invention comprises a base material and exhaust gas purifying catalysts held on the base material, wherein out of the exhaust gas purifying catalysts held on the base material, the exhaust gas purifying catalyst supported on the exhaust gas flow upstream side of the base material is the exhaust gas purifying catalyst of the present invention.

The base material used in the exhaust gas purifying device of the present invention includes a honeycomb base material, for example, a cordierite-made honeycomb base material. Any other exhaust gas purifying catalyst may be used as the exhaust gas purifying catalyst supported on the exhaust gas flow downstream side of the base material in the exhaust gas purifying device of the present invention. The base material in the exhaust gas purifying device of the present invention can hold the exhaust gas purifying catalyst of the present invention in the region not greater than two thirds, one half, or one third of the base material, on the exhaust gas flow upstream side of the base material.

<Production Process of Exhaust Gas Purifying Catalyst>

The process of the present invention for producing an exhaust gas purifying catalyst comprises masking, in a solution, at least a part of the surface of a support by a masking agent, introducing the support with at least a part of the surface being masked by a masking agent, into a noble metal-containing solution containing a noble metal, and drying and firing the support and the noble metal-containing solution to support the noble metal on the support.

Generally, in the case of introducing a crystalline metal oxide support into a noble metal-containing solution, the noble metal tends to be adsorbed or coordinated to a defect portion of the crystalline metal oxide support, for example, the edge region (crystal edge region), the step region (stepped region of atomic monolayer), and the kink region (region where the step is bent), etc., of the crystal, and be supported in such a defect portion.

On the other hand, according to the process of the present invention, at least a part of the surface of the crystalline metal oxide support is previously masked by a masking agent. The masking agent tends to be adsorbed or coordinated to a crystal defect portion, as in the case of the noble metal. Accordingly, when such a masked support is introduced into a noble metal-containing solution, the noble metal is not adsorbed or coordinated to the crystal defect portion already masked by a masking agent, but instead, is adsorbed or coordinated to a crystal defect-free portion, i.e., a terrace region or the like of the crystal. Then, when the support having a noble metal adsorbed or coordinated thereto is dried and fired, a relatively-large amount of the noble metal is supported in a region with little crystal defects, such as terrace region, of the support. The masking agent is burned and removed by the firing.

The noble metal particle supported in a region with little crystal defects of the support is susceptible to crystallinity of the support. Accordingly, the noble metal particle can be epitaxially grown on the support by firing or the like, i.e., the noble metal particle can have the crystal orientation similar to that of the crystalline metal oxide support having the noble metal particle supported thereon.

<Production Process of Exhaust Gas Purifying Catalyst—Masking Agent>

The masking agent used in the process of the present invention may be any masking agent capable of masking the crystal defect of the crystalline metal oxide support. Such a masking agent includes a compound having a functional group capable of coordinating to the crystalline metal oxide support, for example, a functional group selected from the group consisting of a secondary amine group, a tertiary amine group, a carboxyl group, a hydroxyl group, a carbonyl group and a combination thereof. Accordingly, the specific masking agent includes an organic compound having one or more of the above-described functional groups, particularly, a polyvalent aromatic carboxylic acid such as terephthalic acid, isophthalic acid, trimesic acid and pyromellitic acid.

<Production Process of Exhaust Gas Purifying Catalyst—Support and Noble Metal>

As to the support and noble metal which can be used in the process of the present invention for producing an exhaust gas purifying catalyst, the above description regarding the exhaust gas purifying catalyst of the present invention may be referred to.

As the noble metal solution used to support the noble metal, it is possible to use, for example, a noble metal solution generally employed to support a noble metal, such as dinitrodiammine nitrate solution and chloroplatinic acid solution, use a noble metal colloid, or use a partially reduced and aggregated noble metal aggregate described below, etc. Use of the below-described partially reduced and aggregated noble metal aggregate is preferred in that the particle diameter of the noble metal particle supported on the support can be controlled and in that the adherence between the support and the noble metal particle supported thereon can be improved to facilitate the epitaxial growth of the noble metal particle.

In the case where a metal oxide support capable of attracting a noble metal due to affinity for the noble metal supported thereon is used as the support, at the time of supporting the partially reduced and aggregated noble metal aggregate on the support by drying and firing from the noble metal aggregate-containing solution, the noble metal is attracted due to affinity between the support and the noble metal, and production of a noble metal particle in the form of relatively tightly adhering to the support can be thereby promoted.

<Production Process of Exhaust Gas Purifying Catalyst—Embodiment where Shape and Size of Noble Metal Particle are Controlled>

In one embodiment of the process of the present invention for producing an exhaust gas purifying catalyst, the noble metal-containing solution is a noble metal aggregate-containing solution containing a partially reduced and aggregated noble metal aggregate. Here, the noble metal aggregate-containing solution can be obtained by providing a raw material solution containing a noble metal ion and/or complex and a polymer, coordinating the noble metal ion and/or complex to the polymer, and partially reducing and aggregating the noble metal ion and/or complex coordinated to the polymer.

In the present invention, partial reduction and aggregation of a noble metal ion and/or complex means that reduction and aggregation are performed, for example, by heating or supply of a reducing agent until entering a state where the noble metal ion and/or complex can be further reduced and/or aggregated. Whether the noble metal ion and/or complex are partially reduced and aggregated can be judged, for example, by measuring the absorbance of a solution containing such a noble metal aggregate. That is, the absorbance can be indicative of the degree of aggregation of noble metal particles. A high absorbance means that in the noble metal aggregate-containing solution, the noble metal forms a large aggregate and/or the noble metal forms a dense aggregate. Accordingly, the state of the noble metal being "partially reduced and aggregated" means a state where the "reduction and aggregation" is allowed to further proceed, i.e., the absorbance can be further increased.

In the following, the principle of this embodiment is conceptually described by referring to FIG. 7, but the present invention is not limited to this description.

Figure 7:
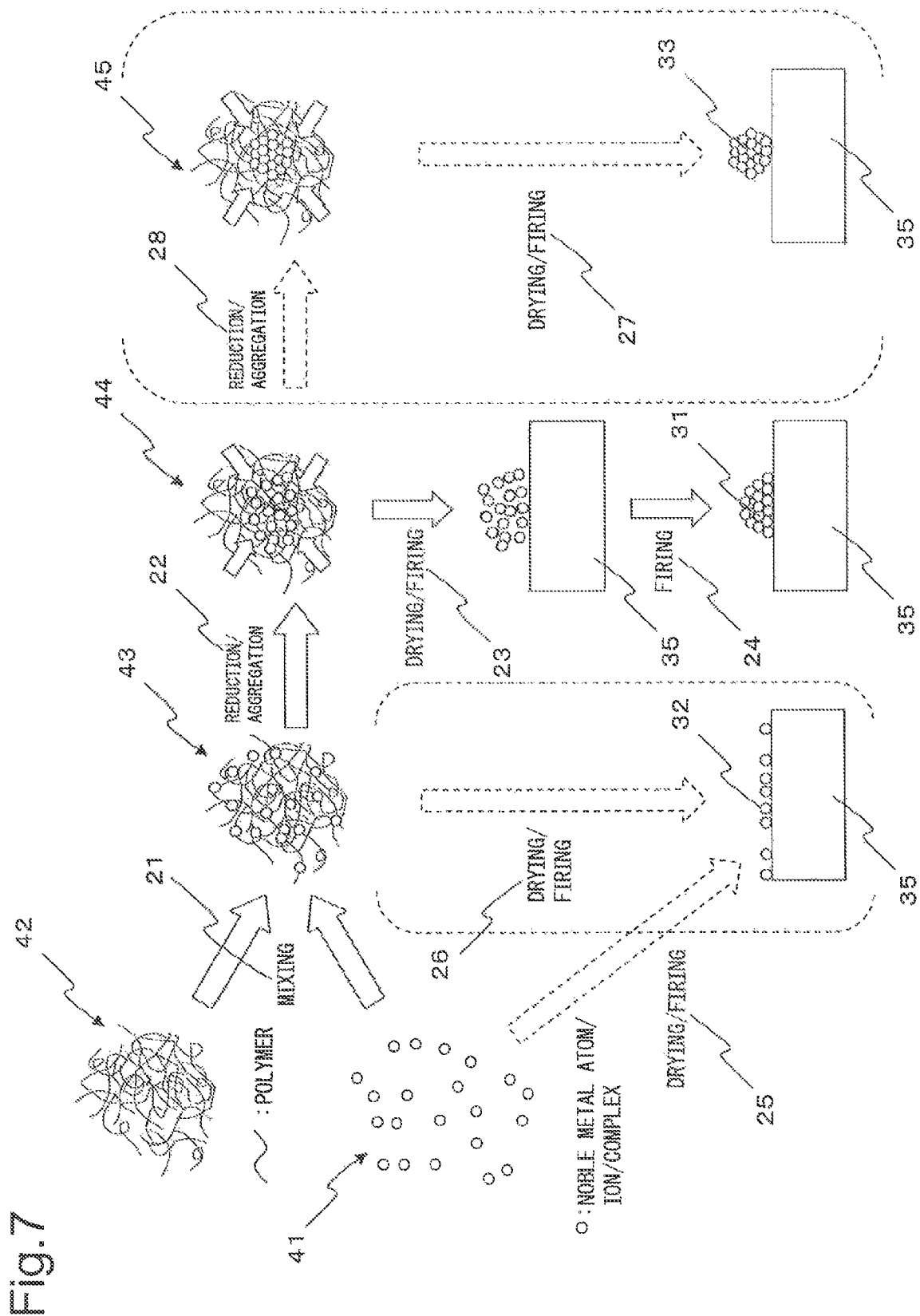
FIG. 7 is a view for conceptually explaining the process of producing an exhaust gas purifying catalyst by controlling the shape and size of the noble metal particle.

As shown in FIG. 7, in this embodiment, first, a noble metal solution (41) containing a noble metal ion and/or complex and a polymer solution (42) containing a polymer are provided, and these solutions are mixed (21) to coordinate (43) the noble metal ion and/or complex to the polymer. The noble metal ion and/or complex coordinated to the polymer are partially reduced and aggregated (22) to form (44) a partially reduced and aggregated noble metal aggregate in the polymer. Thereafter, a support (35) with a part of the surface being masked by a masking agent is introduced into the solution containing the aggregate, and the support and the noble metal aggregate are dried and fired (23, 24) to support the noble metal aggregate (31) on the support (35).

In this embodiment, a noble metal aggregate which is only partially reduced and aggregated, i.e., a noble metal aggregate which is not completely reduced and aggregated and is relatively loosely aggregated, is supported on the support. According to this configuration, the noble metal particle can be supported in the generally hemisphere form on the support so as to put the noble metal into relatively tight adherence to the support.

In the case where the noble metal particle and the support are relatively tightly adhered, and therefore the noble metal particle is supported in the generally hemisphere form on the support, owing to a large contact area between the noble metal particle and the support, movement of the noble metal and the resulting grain growth of the noble metal can be suppressed during use of the catalyst. Furthermore, in this embodiment, the noble metal is present as a particle having a predetermined size, so that the catalytic activity can be promoted.

On the other hand, in the case (25) of directly supporting a noble metal on a support by using a noble metal solution (41) containing the noble metal ion and/or complex and in the case of mixing (43) a noble metal solution and a polymer solution and then supporting (26) the noble metal on a support without performing partial reduction and aggregation of the noble metal ion and/or complex, the noble metal is dispersed and supported (32) in an atom level on the support, and therefore the advantage due to the presence of the noble metal as a particle having a predetermined size cannot be obtained.

Also, in the case of highly reducing and aggregating (28) the noble metal ion or complex coordinated to the polymer, aggregation of noble metal atoms with each other proceeds in the polymer and a spherical stable structure is finally formed (45). In the case where the support (35) is introduced into the solution containing such an aggregate, and then the support and the raw material solution are dried and fired to support (27) the noble metal aggregate on the support, the noble metal is firmly aggregated to have a spherical stable structure (33) and cannot be tightly adhered to the support. Accordingly, in this case, because of the small contact area between the noble metal and the support, it is difficult to inhibit movement of the noble metal during use of the catalyst and the resulting grain growth of the noble metal.

Incidentally, in this embodiment, a noble metal aggregate is dispersed in the solution and the support is introduced into the solution to support a noble metal particle on the support, so that the noble metal aggregated can be supported on not only the outer surface of the support, but also the inner surface of the support, for example, in the inside of a pore or when the support is composed of a secondary particle, in the gap between primary particles, etc.

<Production Process of Exhaust Gas Purifying Catalyst—Embodiment where Shape and Size of Noble Metal Particle are Controlled—Partial Reduction and Aggregation>

In the embodiment where the exhaust gas purifying catalyst is produced by controlling the shape and size of the noble metal particle, the noble metal ion and/or complex coordinated to the polymer can be partially reduced and aggregated by any method. The specific method for performing the partial reduction and aggregation includes, for example, a heat treatment such as reflux under heating, addition of a reducing agent, and a combination thereof. In the case of performing the reduction and aggregation by a heat treatment, the partial reduction and aggregation of the noble metal ion and/or complex can be achieved by controlling the degree of heating and/or the heating time. In the case of performing the reduction and aggregation by using a reducing agent, the partial reduction and aggregation of the noble metal ion and/or complex can be achieved, for example, by selecting the kind of the reducing agent or adjusting the amount of the reducing agent used. For example, the reducing agent includes an alcohol such as methanol, ethanol and propanol.

The degree of partial reduction and aggregation of the noble metal ion and/or complex can be determined depending on, for example, the intended size of the noble metal particle or the intended shape of the noble metal particle. Generally, in the case where the degree of partial reduction and aggregation of the noble metal ion and/or complex is small, and therefore the noble metal is relatively loosely aggregated, there is a tendency that the size of the noble metal particle is small and/or the noble metal particle tightly adheres to the support.

<Production Process of Exhaust Gas Purifying Catalyst—Embodiment where Shape and Size of Noble Metal Particle are Controlled—Polymer>

Any polymer to which the noble metal ion and/or complex can be coordinated may be used as the polymer in the embodiment where the exhaust gas purifying catalyst is produced by controlling the shape and size of the noble metal particle. Accordingly, the polymer may include, for example, a polymer having a functional group allowing for coordination of a metal, such as secondary amine group, tertiary amine group, carboxyl group, hydroxyl group and carbonyl group, particularly a functional group such as secondary amine group and tertiary amine group, for example, polyvinylpyrrolidone. In addition, the polymer which may be used in the process of the present invention may include a dendrimer as used in Patent Documents 1 and 2.

The amount of the polymer used in the process of the present invention may be arbitrarily determined depending on, for example, the coordination ability of the polymer to the noble metal ion and/or complex, the intended size of the noble metal particle, and the intended shape of the noble metal particle.

EXAMPLES

Example 1

Platinum-Supported Ceria-Zirconia Catalyst A-1

Ion-exchanged water was added to a dinitrodiammine platinum nitrate ($[Pt(NO_2)_2(NH_3)_2]$) solution having a total platinum content of $4.50 \times 10^{-3}$ mol, and the solution was stirred to obtain 300 g of a diluted platinum solution. 300 g of ion-exchanged water was added to 2.52 g of polyvinylpyrrolidone (PVP) in a concentration of $2.25 \times 10^{-2}$ mol (5 times the molar number of platinum) in terms of monomer unit, and the polyvinylpyrrolidone was completely dissolved by stirring to prepare a uniform polyvinylpyrrolidone solution.

Thereafter, the diluted platinum solution was slowly added dropwise to and mixed with the polyvinylpyrrolidone solution, and the resulting mixture was stirred at room temperature for 1 hour. Then, ethanol was added to the mixture as a reducing agent to give a mixing ratio of ion-exchanged water and ethanol of 20:80 (by mass), and the resulting mixture was stirred for 30 minutes to obtain a platinum-polyvinylpyrrolidone solution. The thus-obtained platinum-polyvinylpyrrolidone solution was refluxed under heating, thereby reducing the platinum ion to obtain a platinum fine particle-containing solution. Here, the platinum fine particle-containing solution was obtained by performing the reflux under heating at 100° C. for 4 hours.

Furthermore, 30 g of ceria-zirconia solid solution (crystalline, Ce:Zr=7:3, prepared by a coprecipitation process) support powder was dispersed in 180 g of distilled water, and 60 g of pyromellitic acid was added thereto. After stirring, the above platinum fine particle solution obtained by performing the reflux under heating was added to have a platinum content of 0.5 wt % based on the support powder, and the resulting mixture was stirred for 1 hour. Thereafter, water was evaporated at 120° C., and the residue was fired at 500° C. for 2 hours and ground in a mortar to prepare Platinum-Supported Ceria-Zirconia Catalyst A-1.

<Platinum-Supported Ceria-Zirconia Catalyst A-2>

Platinum-Supported Ceria-Zirconia Catalyst A-2 was prepared in the same manner as in Platinum-Supported Ceria-Zirconia Catalyst A-1, except for not adding pyromellitic acid.

<Platinum-Supported Ceria-Zirconia Catalyst A-3>

Platinum-Supported Ceria-Zirconia Catalyst A-3 was prepared in the same manner as in Platinum-Supported Ceria-Zirconia Catalyst A-1, except for not preparing a platinum fine particle-containing solution, but directly using the dinitrodiammine platinum nitrate solution.

<Observation>

Catalysts A-1 and A-2 were subjected to observation by a transmission electron microscope (TEM). FIG. 3 shows the results.

FIG. 3(a) is a TEM photograph of Catalyst A-1 using pyromellitic acid as the masking agent, and FIG. 3(b) is a TEM photograph of Catalyst A-2 in which a masking agent was not used.

As clearly understood from comparison between FIG. 3(a) and FIG. 3(b), in Catalyst A-1 using pyromellitic acid as the masking agent (FIG. 3(a)), the platinum particle was epitaxially grown in the terrace region of the crystalline metal oxide support, whereas in Catalyst A-2 not using a masking agent (FIG. 3(b)), the platinum particle was supported in the edge region of the crystalline metal oxide support. A similar tendency was seen in other noble metal particles which can be observed for these values by TEM.

<Evaluation>

Each of Platinum-Supported Ceria-Zirconia Catalysts A-1 to A-3 was formed into a pellet and evaluated as follows for the hydrocarbon (HC) concentration of the outgoing gas by using an apparatus shown in FIG. 13.

Endurance Conditions:

Heated at 900° C. for 5 hours by switching the atmosphere between rich and lean atmospheres every two minutes.

Amount of Exhaust Gas Purifying Catalyst:

2.0 g (platinum concentration: 0.5 wt %).

Evaluation Conditions:

The temperature was raised to 500° C. in a nitrogen atmosphere, reduction was performed for 5 minutes under the condition of hydrogen 1.0%, the system was then switched to the evaluation gas conditions ($C_3H_6$: 3,000 ppmC, $O_2$: 10%, $CO_2$: 12%, $H_2O$: 5%), the temperature was lowered at 10° C./min, and the outgoing gas was measured by a continuous analyzer. The gas flow rate was 20 L/min.

Figure 4:
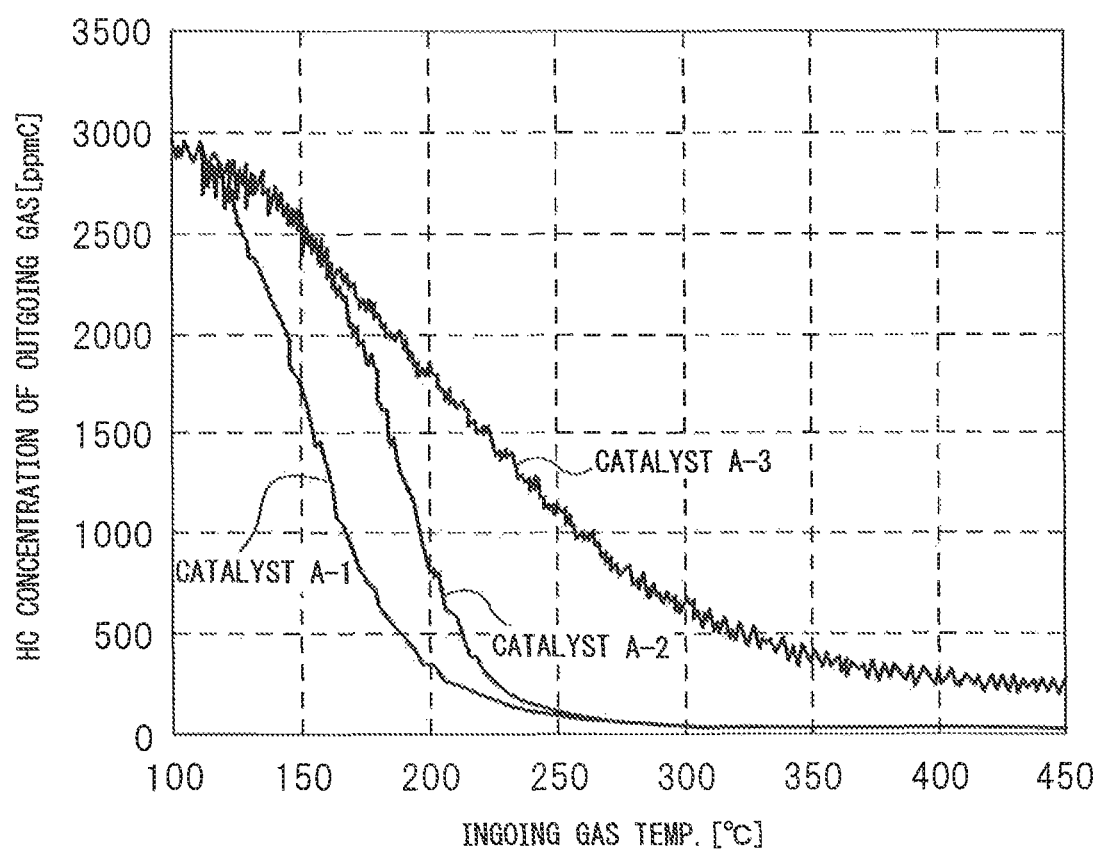
FIG. 4 is a view showing the evaluation results of the hydrocarbon (HC) purifying performance of Exhaust Gas Purifying Catalysts A-1 to A-3 (Example 1).

FIG. 4 shows the evaluation results. As understood from FIG. 4, the performance of Catalyst A-3 obtained by directly using the dinitrodiammine platinum nitrate solution without preparing the platinum fine particle-containing solution was worst. On the other hand, it is understood that Catalyst A-1 using pyromellitic acid as the masking agent has excellent hydrocarbon (HC) purifying performance compared with Catalyst A-2 in which a masking agent was not used. Incidentally, the hydrocarbon (HC) 50% purification temperature (the temperature at which the HC purification ratio becomes 50%) of Catalysts A-1 to A-3 was 155° C., 184° C. and 223° C., respectively.

Example 2

Rhodium-Supported Ceria Catalyst B-1

Ion-exchanged water was added to a rhodium nitrate (Rh $(NO_3)_3$) solution having a total rhodium content of $7.50 \times 10^{-3}$ mol, and the solution was stirred to obtain 300 g of a diluted rhodium solution. 300 g of ion-exchanged water was added to 2.52 g of polyvinylpyrrolidone (PVP) in a concentration of $2.25 \times 10^{-2}$ mol (3 times the molar number of rhodium) in terms of monomer unit, and the polyvinylpyrrolidone was completely dissolved by stirring in order to obtain a uniform polyvinylpyrrolidone solution.

Thereafter, the diluted rhodium solution was slowly added dropwise to and mixed with the polyvinylpyrrolidone solution, and the resulting mixture was stirred at room temperature for 1 hour. Then, 1-propanol was added to the mixture as a reducing agent to give a mixing ratio of ion-exchanged water and 1-propanol of 20:80 (by mass), and the resulting mixture was stirred for 30 minutes to obtain a rhodium-polyvinylpyrrolidone solution. The thus-obtained rhodium-polyvinylpyrrolidone solution was refluxed under heating, thereby reducing the rhodium ion to obtain a rhodium fine particle-containing solution. The rhodium fine particle-containing solution was obtained by performing the reflux under heating at 100° C. for 4 hours.

10 g of ceria (previously fired in an air at 1,000° C. for 5 hours) support powder was dispersed in 60 g of distilled water, and 20 g of pyromellitic acid was added thereto. After stirring, the above rhodium fine particle solution obtained by performing the reflux under heating was added to have a rhodium content of 1.0 wt % based on the support powder, and the resulting mixture was stirred for 1 hour. Thereafter, water was evaporated at 120° C., and the residue was fired at 450° C. for 2 hours and ground in a mortar in order to obtain Rhodium-Supported Ceria Catalyst B-1.

<Rhodium-Supported Ceria Catalyst B-2>

Rhodium-Supported Ceria Catalyst B-2 was prepared in the same manner as in Rhodium-Supported Ceria Catalyst B-1, except for using a rhodium chloride solution in place of the rhodium nitrate solution, using ethanol in place of 1-propanol, and performing the reflux under heating at 80° C. for 4 hours.

<Rhodium-Supported Ceria Catalyst B-3>

Rhodium-Supported Ceria Catalyst B-3 was prepared in the same manner as in Rhodium-Supported Ceria Catalyst B-1, except for not preparing a rhodium fine particle-containing solution, but directly using the rhodium nitrate solution.

<Observation>

Figure 17:
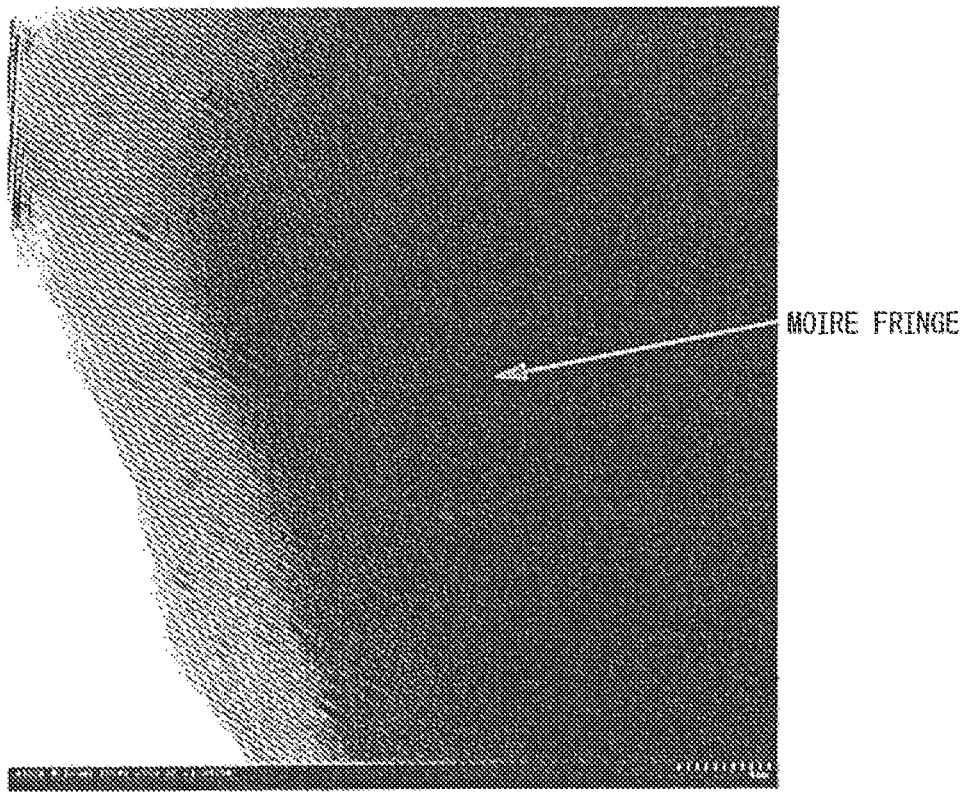
FIG. 17 is a TEM photograph of Catalyst B-1 of the present invention (Example 2).
Figure 18:
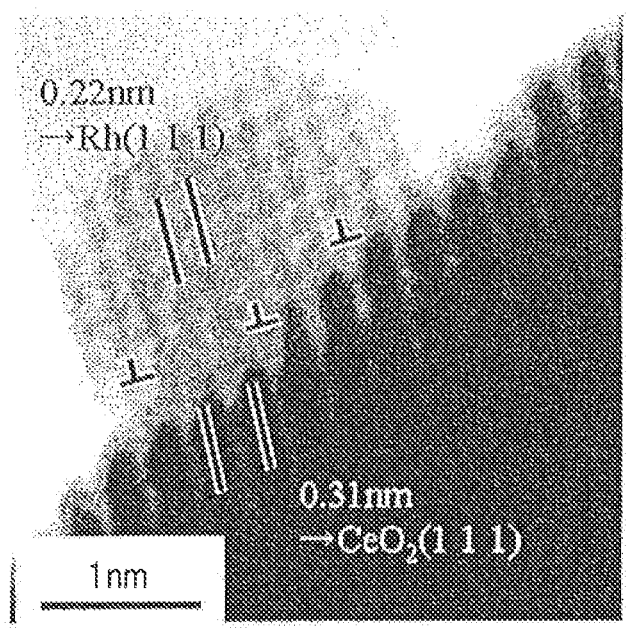
FIG. 18 is a TEM photograph of Catalyst B-1 of the present invention (Example 2).
Figure 19:
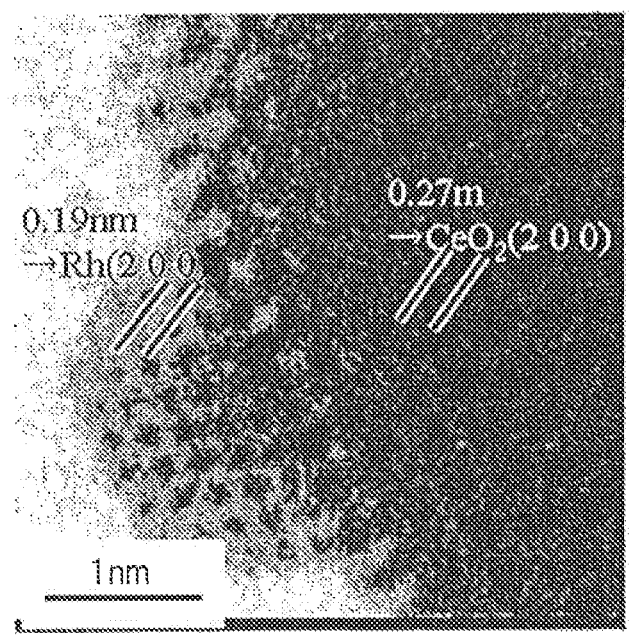
FIG. 19 is a TEM photograph of Catalyst B-1 of the present invention (Example 2).

Catalyst B-1 was observed by a transmission electron microscope (TEM), and FIGS. 17 to 19 show the results.

In FIG. 17, a moire fringe was observed in the portion where rhodium particles having a size of 5 nm or less are present on the support, and it was observed that many moire fringes were oriented in the same direction. These moire fringes indicate that there is a correlation between the crystal direction of the support and the crystal direction of rhodium. Also, FIGS. 18 and 19 show the results when individual rhodium particles present on the end surface of the support were observed. It is understood from FIGS. 18 and 19 that the rhodium and the support have a crystal plane bonding of (111) planes or (200) planes to each other.

Figure 20:
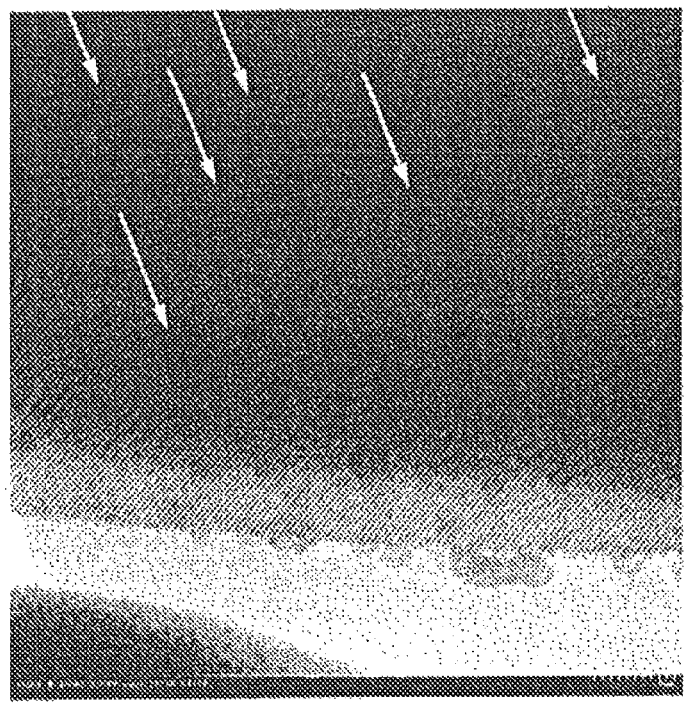
FIG. 20 is a TEM photograph of conventional Catalyst B-2 (Example 2).

Catalyst B-2 was observed by a transmission electron microscope (TEM), and FIG. 20 shows the results.

It is understood from FIG. 20 that a moire fringe was not observed in the portion (shown by an arrow) where rhodium particles having a size greater than about 5 nm are present on the support. This means that there is no or very little correlation between the crystal direction of the rhodium particle having a size greater than 5 nm and the crystal direction of the support.

Figure 21:
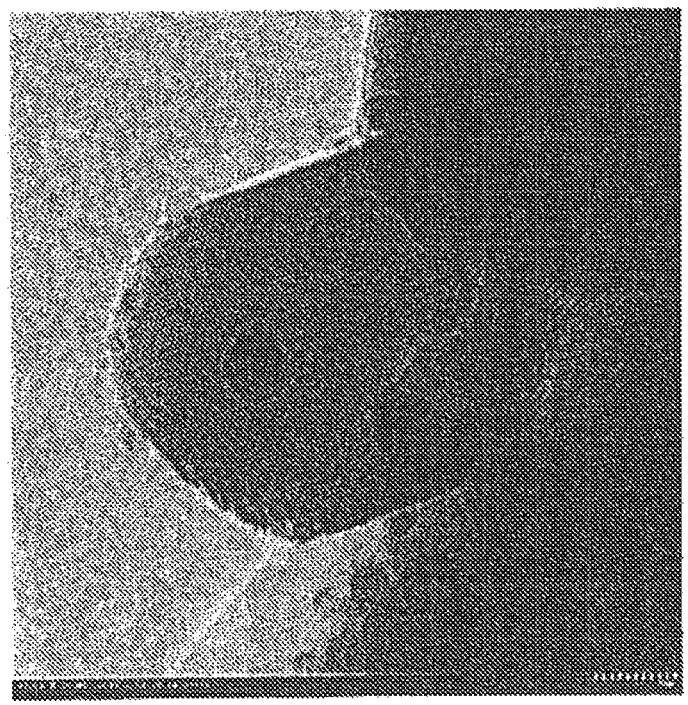
FIG. 21 is a TEM photograph of conventional Catalyst B-3 (Example 2).

Catalyst B-3 was observed by a transmission electron microscope (TEM), and FIG. 21 shows the results.

It is understood from FIG. 21 that when rhodium was supported on the support by directly using the rhodium nitrate solution, the rhodium particles on the support have a great variation in the particle diameter and a moire fringe was not observed.

<Evaluation>

Rhodium-Supported Ceria Catalysts B-1 to B-3 were evaluated as follows for the average particle diameter of rhodium before and after thermal endurance.

Endurance Conditions:

Heated at 1,000° C. for 5 hours by switching the atmosphere between rich and lean atmospheres every two minutes.

Sample: 0.1 g

Carbon Monoxide Adsorption Conditions:

The exhaust gas purifying catalyst was oxidized in oxygen under heating at 400° C. for 20 minutes and then reduced in hydrogen under heating at 400° C. for 20 minutes, and thereafter carbon monoxide was adsorbed into the exhaust gas purifying catalyst at 0° C.

Sample: 0.1 g

Carbon Monoxide Adsorption Conditions:

The exhaust gas purifying catalyst was oxidized in oxygen under heating at 400° C. for 20 minutes and then reduced in hydrogen under heating at 400° C. for 20 minutes, and thereafter carbon monoxide was adsorbed into the exhaust gas purifying catalyst at 0° C.

Figure 22:
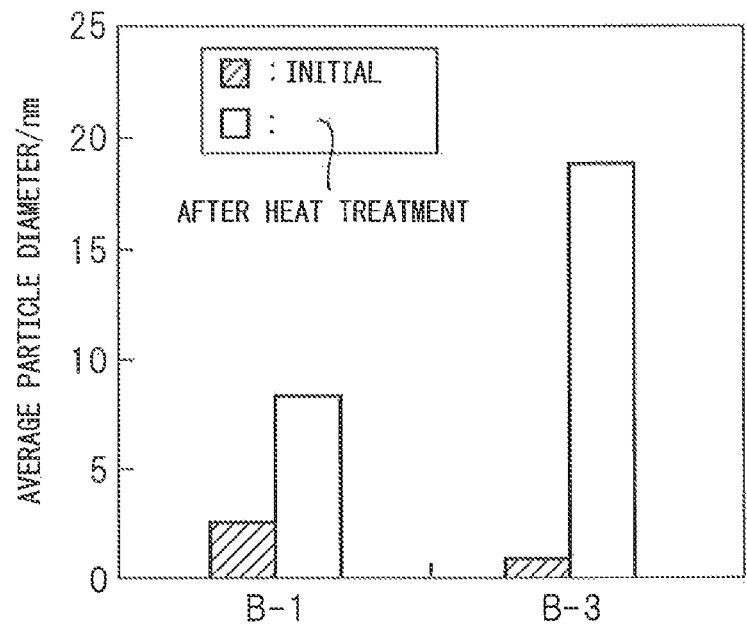
FIG. 22 is a view showing the average particle diameter of rhodium before endurance and after endurance of Catalyst B-1 of the present invention and conventional Catalyst B-3 (Example 2).

FIG. 22 shows the evaluation results. FIG. 22 shows that compared with the conventional rhodium-supported ceria catalyst B-3 obtained by the method of directly supporting rhodium using rhodium nitrate, in Rhodium-Supported Ceria Catalyst B-1 of the present invention, the particle diameter of rhodium after endurance is kept small. This is believed to be due to the reason that since the interaction between the support and the rhodium particle is strong in Catalyst B-1 of the present invention, movement of the noble metal particle on the support is restrained, resulting in suppressing sintering of the noble metal particle.

Example 3

Platinum-Supported Ceria-Zirconia Catalyst C-1

Platinum-Supported Ceria-Zirconia Catalyst C-1 of the present invention was prepared in the same manner as in Platinum-Supported Ceria-Zirconia Catalyst A-1 by using the polyvinylpyrrolidone solution and the diluted platinum solution.
<Platinum-Supported Ceria-Zirconia Catalyst C-2>
Conventional Platinum-Supported Ceria-Zirconia Catalyst C-2 was prepared in the same manner as in Platinum-Supported Ceria-Zirconia Catalyst C-1, except for not preparing a platinum fine particle-containing solution, but directly using the dinitrodiammine platinum nitrate solution.
<Evaluation>
With respect to Platinum-Supported Ceria-Zirconia Catalysts C-1 and C-2, the average particle diameter distribution of platinum after thermal endurance was evaluated as follows.
Endurance Conditions:
Heated at 800° C. for 5 hours by switching the atmosphere between the following rich and lean atmospheres every two minutes:
Rich atmosphere: CO—3%, $H_2$-5%, $N_2$-balance,
Lean atmosphere: $O_2$-5%, $H_2$-5%, $N_2$-balance.
Evaluation Conditions:
The ceria-zirconia support was dissolved with an acid to obtain a platinum particle dispersion liquid where only platinum particles are dispersed. Thereafter, the platinum particle dispersion liquid was analyzed by a dynamic light scattering particle diameter distribution analyzer (DLS) to obtain the particle size distribution of platinum particles. Incidentally, since the platinum particle is not affected by an acid, this method makes it possible to know the particle size distribution of platinum particles in the platinum-supported ceria-zirconia catalyst.

Figure 23:
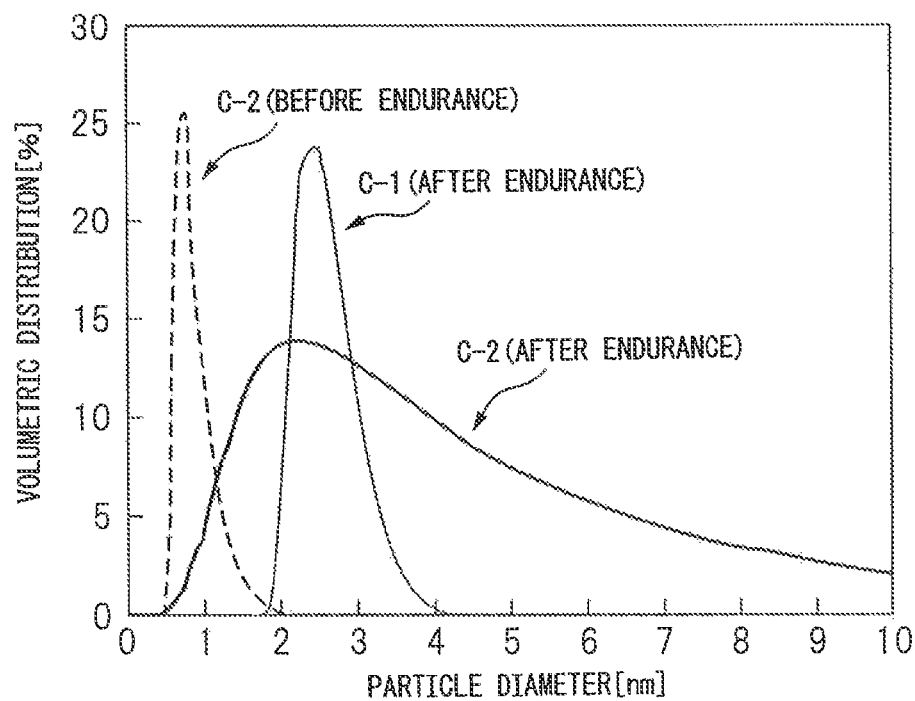
FIG. 23 is a view showing the particle diameter distribution of platinum after endurance of Catalyst C-1 of the present invention and conventional Catalyst C-2 (Example 3).

FIG. 23 shows the evaluation results. For reference, with respect to Platinum-Supported Ceria-Zirconia Catalyst C-2, the particle size distribution before endurance is also shown in FIG. 23.

In Platinum-Supported Ceria-zirconia Catalyst C-1 prepared using the polyvinylpyrrolidone solution and the diluted platinum solution, the average particle size after endurance was about 2.6 nm. Also, in Catalyst C-2 obtained by directly using the dinitrodiammine platinum nitrate solution without preparing the platinum fine particle-containing solution, the average particle size after endurance was about 2.4 nm.

It is understood from FIG. 23 that in Platinum-Supported Ceria-zirconia Catalyst C-1 prepared using the polyvinylpyrrolidone solution and the diluted platinum solution, the particle size distribution after endurance is narrow and the full width at half maximum is about 1 nm. This is believed to be due to the reason that in Catalyst C-1, the noble metal having a relatively uniform size is supported on the support in preparation of the catalyst, and the interaction between the support and the noble metal is strong, thereby suppressing sintering of the noble metal during endurance.

On the other hand, it is understood from FIG. 23 that in Catalyst C-2 obtained by directly using the dinitrodiammine platinum nitrate solution without preparing the platinum fine particle-containing solution, although the average particle size is small and the particle size is uniform before endurance, the particle size distribution is broadened and the full width at half maximum is greater than 4 nm after endurance. This is believed to be due to the reason that in Catalyst C-2, although the noble metal having a very fine size is supported on the support in preparation of the catalyst, the interaction between the support and the noble metal is small, resulting in proceeding sintering of the noble metal during endurance.

Example 4

Platinum-Supported Ceria-Zirconia Catalyst D-1

Figure 13:
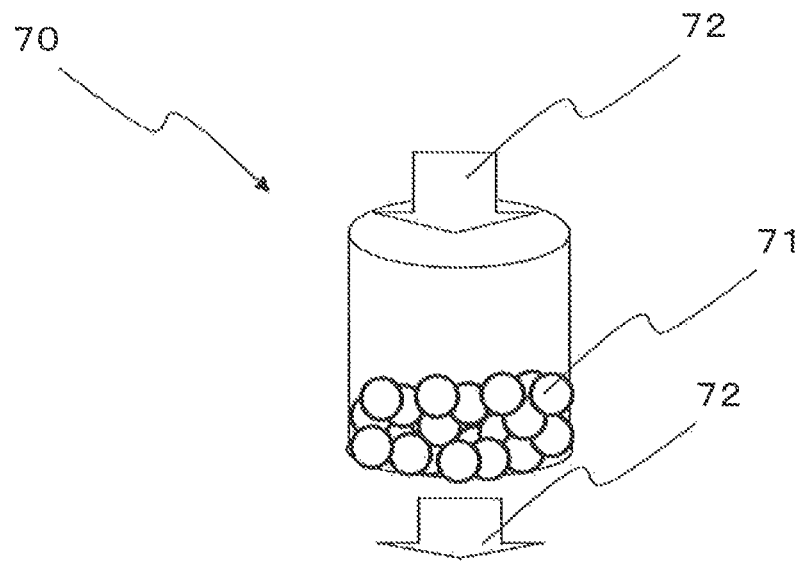
FIG. 13 is a schematic view of the testing apparatus used in Examples 1 and 4 and Reference Examples 3 and 4.

Platinum-Supported Ceria-Zirconia Catalyst D-1 of the present invention was prepared in the same manner as in Platinum-Supported Ceria-Zirconia Catalyst A-1 by using the polyvinylpyrrolidone solution and the diluted platinum solution.
<Platinum-Supported Ceria-Zirconia Catalyst D-2>
Conventional Platinum-Supported Ceria-Zirconia Catalyst D-2 was prepared in the same manner as in Platinum-Supported Ceria-Zirconia Catalyst D-1, except for not preparing a platinum fine particle-containing solution, but directly using the dinitrodiammine platinum nitrate solution.
<Evaluation 1>
Each of Platinum-Supported Ceria-Zirconia Catalysts D-1 and D-2 was formed into a pellet and evaluated as follows for the rate of the catalyst bed temperature by using an apparatus shown in FIG. 13.
Endurance Conditions:
Heated at 900° C. for 5 hours by switching the atmosphere between rich and lean atmospheres every two minutes:
Amount of Exhaust Gas Purifying Catalyst:
2.0 g (platinum concentration: 0.5 wt %).
Evaluation Conditions:
The temperature was raised to 500° C. in a nitrogen atmosphere, reduction was performed for 5 minutes under the condition of hydrogen 1.0%, the system was then switched to the evaluation gas conditions ($C_3H_6$: 3,000 ppmC, $O_2$: 10%, $CO_2$: 12%, $H_2O$: 5%), the ingoing gas temperature was raised at 10° C./min, and the catalyst bed temperature was measured. The gas flow rate was 20 L/min.

Figure 24:
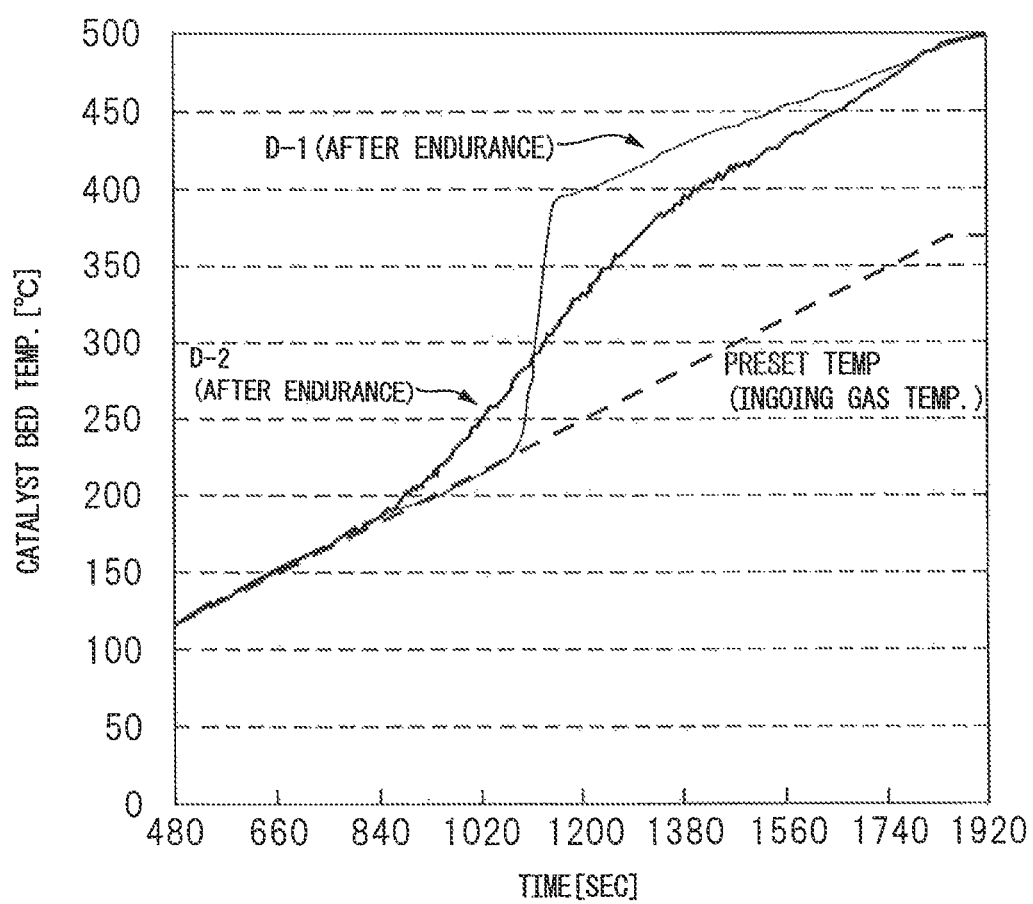
FIG. 24 is a view showing the change in the catalyst bed temperature of Catalyst D-1 of the present invention and conventional Catalyst D-2 (Example 4 <Evaluation 1>).

FIG. 24 shows the evaluation results. As understood from FIG. 24, in Platinum-Supported Ceria-Zirconia Catalyst C-1 of the present invention, compared with conventional Platinum-Supported Ceria-Zirconia catalyst C-2, the catalyst bed temperature slowly rises at the initial stage but once the rise of the catalyst bed temperature starts, the catalyst bed temperature rapidly rises to about 400° C. at which a preferred exhaust gas purification ratio is achieved.

This is believed to be due to the reason that in Platinum-Supported Ceria-Zirconia Catalyst C-1 of the present invention, as demonstrated in Example 3, the particle size distribution of the noble metal is narrow, and therefore many noble metal particles are activated at a time at a specific temperature. On the other hand, it is believed that in conventional Platinum-Supported Ceria-Zirconia catalyst C-2, as demonstrated in Example 3, although a very fine noble metal particle is present, the particle size distribution of the noble metal is broad and the ratio of such a fine noble metal particle based on the entirety is small, and therefore a relatively high temperature is necessary for the activation of noble metal particles in a large ratio.

<Evaluation 2>

Platinum-Supported Ceria-Zirconia Catalysts D-1 and D-2 were supported on a cordierite-made honeycomb support as shown in FIG. 25(a), i.e., Platinum-supported Ceria-Zirconia Catalyst D-1 was coated in the one-third region on the exhaust gas inlet side of the honeycomb support, and Platinum-supported Ceria-Zirconia Catalyst D-2 was coated in the two-thirds region on the exhaust gas outlet side of the honeycomb support to obtain Catalyst Device X-1 of the present invention.

Platinum-Supported Ceria-Zirconia Catalyst D-2 was supported on a cordierite-made honeycomb support as shown in FIG. 25(b), i.e., Platinum-supported Ceria-Zirconia Catalyst D-2 was coated on the entirety of the honeycomb support to obtain Catalyst Device X-2 of Comparative Example.

Catalyst Device X-1 of the present invention and conventional Catalyst Device X-2 were evaluated as follows for the total hydrocarbon (THC) concentration of the outgoing gas.

Endurance Conditions:

Heated at a catalyst bed temperature of 900° C. for 50 hours by driving an engine of 2.4 L displacement at high load and supplying the exhaust gas.

Amount of Exhaust Gas Purifying Catalyst:

2.0 g (platinum concentration: 0.5 wt %).

Evaluation Conditions:

Each of Catalyst Device X-1 of the present invention and Catalyst Device X-2 of Comparative Example was connected to an actual engine, and the outgoing gas was measured by a continuous analyzer. The gas flow rate was 20 L/min.

FIG. 26 shows the evaluation results. It is understood from FIG. 26 that in Catalyst Device X-1 of the present invention, compared with Catalyst Device X-2 of Comparative Example, reduction in the hydrocarbon concentration in the outgoing gas occurs in a relatively early stage, i.e., the rising performance of the catalyst device is excellent.

This is believed to be due to the reason that in Platinum-Supported Ceria-Zirconia Catalyst D-1 of the present invention, compared with conventional Platinum-supported Ceria-Zirconia Catalyst D-2, the catalyst bed temperature slowly rises at the initial stage, but once the rise of the catalyst bed temperature starts, the catalyst bed temperature rapidly rises thereafter.

Reference Example 1

Ion-exchanged water was added to a dinitrodiammine platinum nitrate ($[Pt(NO_2)_2(NH_3)_2]$) solution having a total platinum content of $4.50 \times 10^{-3}$ mol, and the solution was stirred to obtain 300 g of a diluted platinum solution. 300 g of ion-exchanged water was added to 2.52 g of polyvinylpyrrolidone (PVP) in a concentration of $2.25 \times 10^{-2}$ mol (5 times the molar number of platinum) in terms of monomer unit, and the polyvinylpyrrolidone was completely dissolved by stirring to prepare a uniform polyvinylpyrrolidone solution.

Thereafter, the diluted platinum solution was slowly added dropwise to and mixed with the polyvinylpyrrolidone solution, and the resulting mixture was stirred at room temperature for 1 hour. Then, ethanol was added to the mixture to give a mixing ratio of ion-exchanged water and ethanol of 20:80 (by mass), and the resulting mixture was stirred for 30 minutes to obtain a platinum-polyvinylpyrrolidone solution. The thus-obtained platinum-polyvinylpyrrolidone solution was refluxed under heating, thereby reducing the platinum ion to obtain a platinum fine particle-containing solution. Three kinds of platinum fine particle-containing solutions were obtained by performing the reflux under heating at 100° C. for 1 hour, 4 hours and 8 hours.

Each of the platinum-polyvinylpyrrolidone solution not subjected to reflux under heating and the above three kinds of platinum fine particle solutions subjected to reflux under heating was added to 30 g of ceria ($CeO_2$) support powder dispersed in 180 g of distilled water, such that platinum accounts for 0.5 wt % based on the support powder, and the resulting mixture was stirred for 1 hour. Thereafter, water was evaporated at 120° C., and the residue was fired at 450° C. for 2 hours and ground in a mortar to prepare four kinds of platinum-supported ceria-zirconia catalysts. Also, a platinum-supported alumina catalyst was prepared in the same manner by supporting platinum on an alumina support powder with use of a platinum fine particle-containing solution subjected to reflux under heating for 4 hours.

These platinum-supported ceria catalysts were observed by a transmission electron microscope (TEM). FIGS. 8 to 11 show the results.

Figure 8:
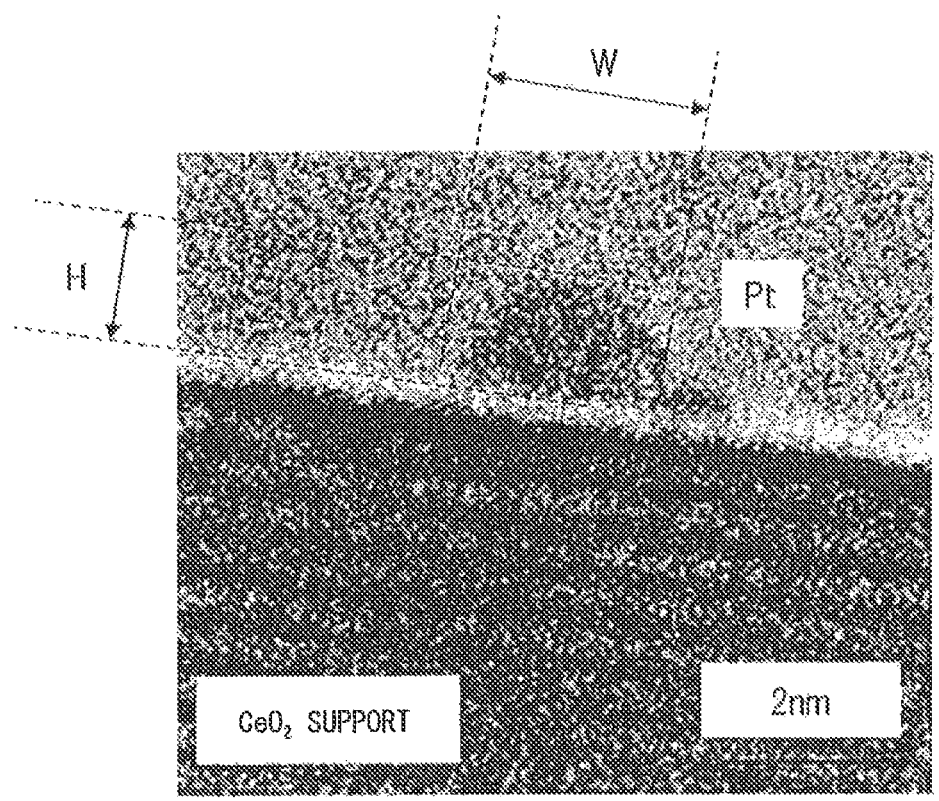
FIG. 8 is a TEM photograph of the platinum-supported ceria catalyst ($Pt/CeO_2$) obtained using a platinum fine particle-containing solution refluxed under heating for 1 hour (Reference Example 1).
Figure 9:
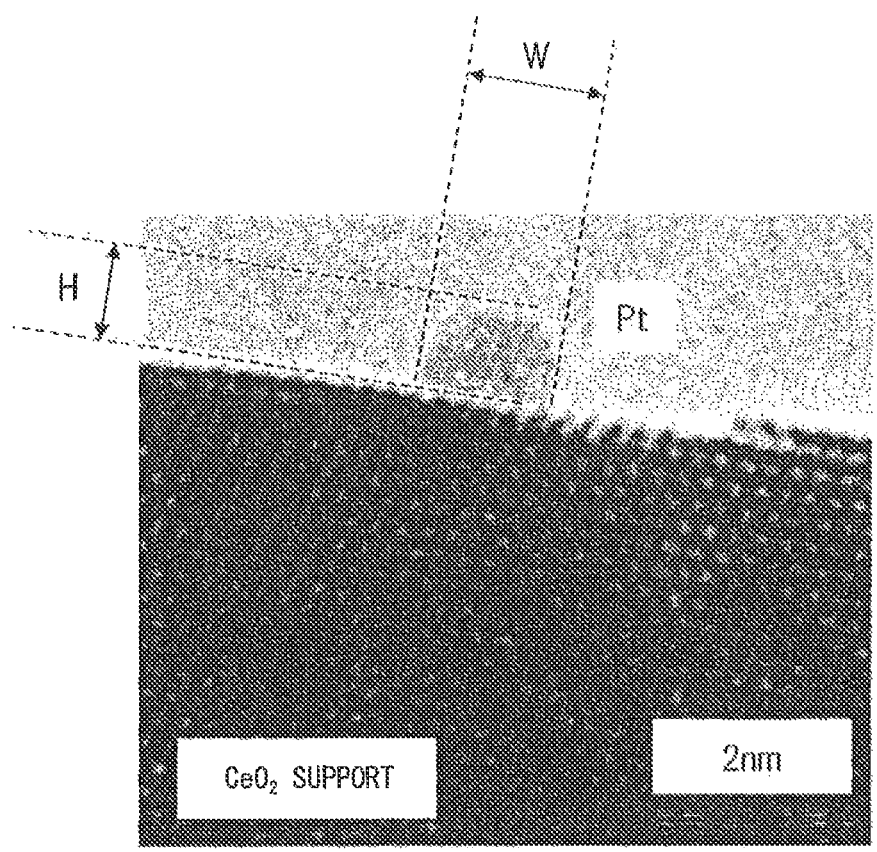
FIG. 9 is a TEM photograph of the platinum-supported ceria catalyst ($Pt/CeO_2$) obtained using a platinum fine particle-containing solution refluxed under heating for 4 hours (Reference Example 1).
Figure 10:
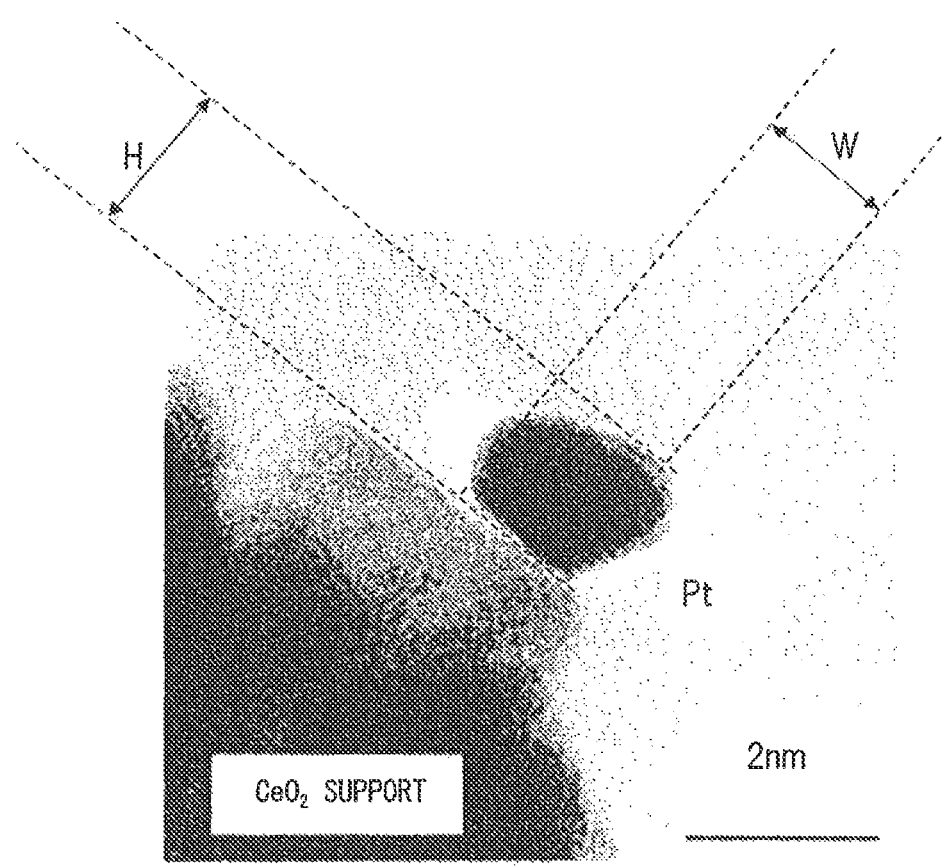
FIG. 10 is a TEM photograph of the platinum-supported ceria catalyst ($Pt/CeO_2$) obtained using a platinum fine particle-containing solution refluxed under heating for 8 hours (Reference Example 1).
Figure 11:
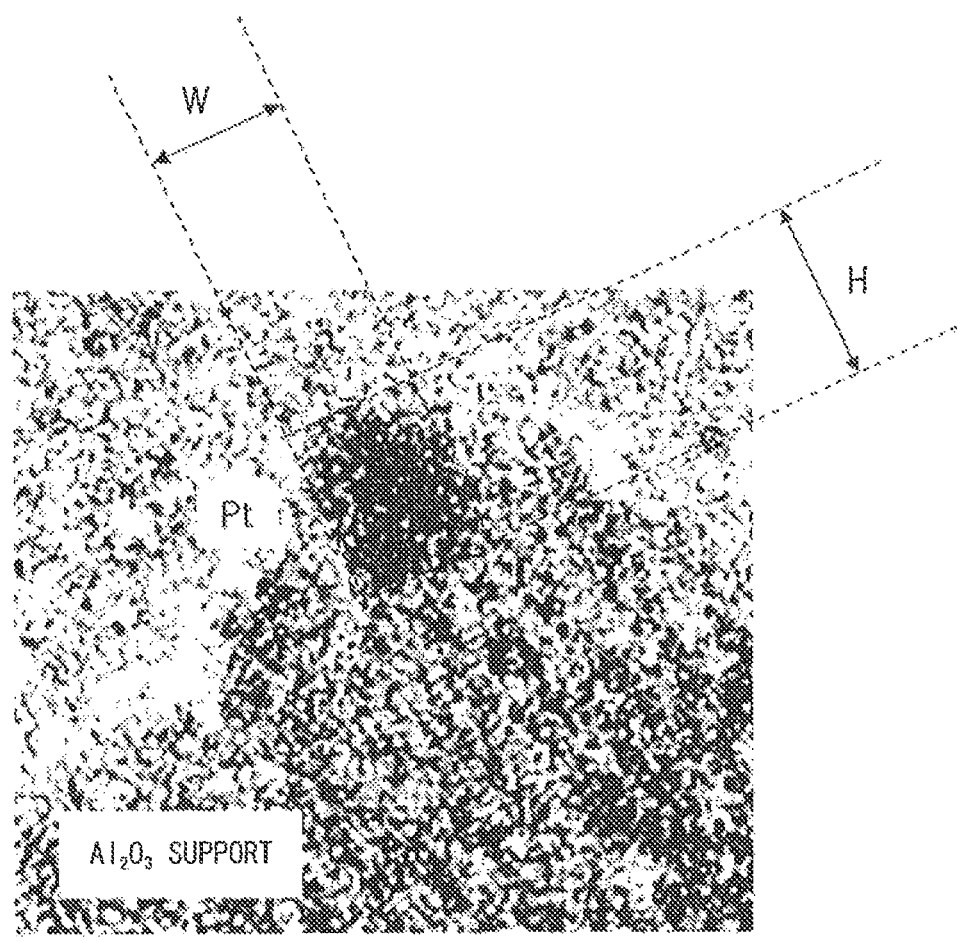
FIG. 11 is a TEM photograph of the platinum-supported alumina catalyst ($Pt/Al_2O_3$) obtained using a platinum fine particle-containing solution refluxed under heating for 4 hours (Reference Example 1).

FIG. 8 to 10 are platinum-supported ceria catalysts (Pt/$CeO_2$) where platinum was supported on a ceria support powder by using platinum fine particle-containing solutions subjected to reflux under heating for 1 hour, 4 hours and 8 hours, respectively. Also, FIG. 11 is a platinum-supported alumina catalyst (Pt/$Al_2O_3$) where platinum was supported on an alumina support powder by using a platinum fine particle-containing solution subjected to reflux under heating for 4 hours. Incidentally, in the platinum-supported ceria catalyst (Pt/$CeO_2$) obtained using a platinum-polyvinylpyrrolidone solution not subjected to reflux under heating, platinum was supported in a very fine state on the ceria support powder, and therefore it was difficult to observe the platinum particle by TEM.

The evaluation results on the platinum-supported ceria catalysts (Pt/$CeO_2$) and the platinum-supported alumina catalyst (Pt/$Al_2O_3$) are shown together in Table 1.

TABLE 1

Figure 6:
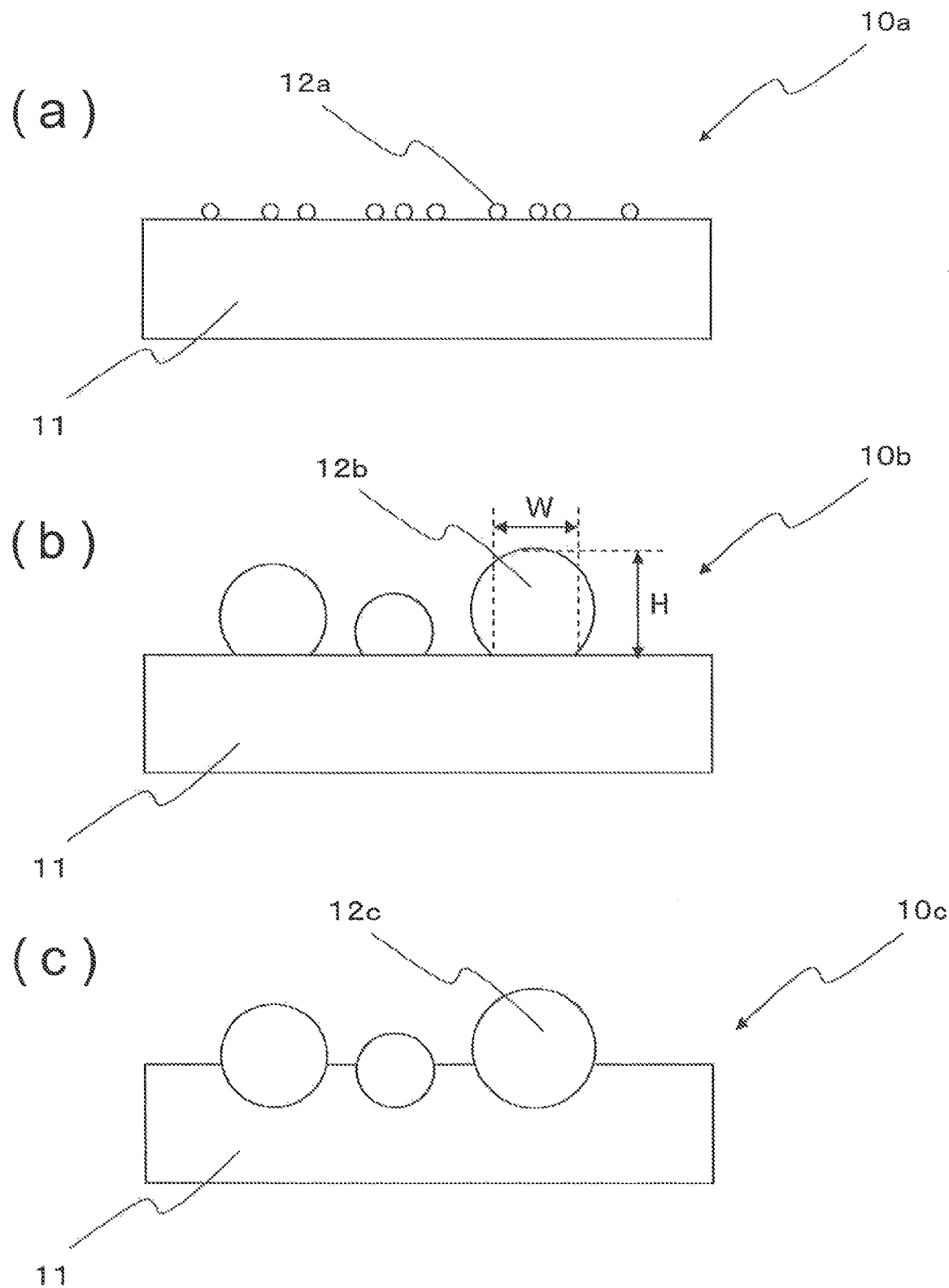
FIG. 6 is a conceptual cross-sectional view of the exhaust gas purifying catalyst where the shape and size of the noble metal particle are not controlled.

| Configuration of Catalyst | Time of Reflux Under Heating | W (nm) | H (nm) | W/H |
|---|---|---|---|---|
| Pt/$CeO_2$ | none | — | — | — |
| Pt/$CeO_2$ (FIG. 4) | 1 hour | 2.28 | 1.36 | 1.68 |
| Pt/$CeO_2$ (FIG. 5) | 4 hours | 1.44 | 1.04 | 1.38 |
| Pt/$CeO_2$ (FIG. 6) | 8 hours | 1.44 | 1.68 | 0.86 |
| Pt/$Al_2O_3$ (FIG. 7) | 4 hours | — | — | 0.75 |

As is clear from Table 1, when a platinum-supported ceria catalyst is obtained by using a platinum fine particle-containing solution where platinum was partially reduced and aggregated by the reflux under heating, i.e., when reflux under heating was performed for 2 hours or 4 hours, the width (W) of the portion of contact between the ceria support and the platinum particle is larger than the height (H) of the platinum particle from the surface of the ceria support. The same tendency was observed in substantially all of the noble metal particles which can be observed for these values by TEM.

Incidentally, as is clear from comparison between FIG. 8 and FIG. 11, in the case of using a platinum fine particle-containing solution obtained by performing the reflux under heating for 4 hours, the platinum particle supported on the ceria support is in a hemispherical shape, whereas the platinum particle supported on the alumina support was in a shape close to a sphere. This is believed to be due to the reason that the ceria support exhibits strong affinity for the noble metal, but the alumina support does not have strong affinity for the noble metal. Accordingly, it is understood that the degree of reduction and aggregation of the noble metal ion or complex must be adjusted depending on the support used.

Reference Example 2

A polyvinylpyrrolidone-platinum solution obtained as in Reference Example 1 was refluxed under heating, thereby reducing and aggregating the platinum ion to obtain a platinum fine particle-containing solution. The reflux under heating was performed for 1 hour, 2 hours, 4 hours and 8 hours to obtain four kinds of platinum fine particle-containing solutions.

Figure 12:
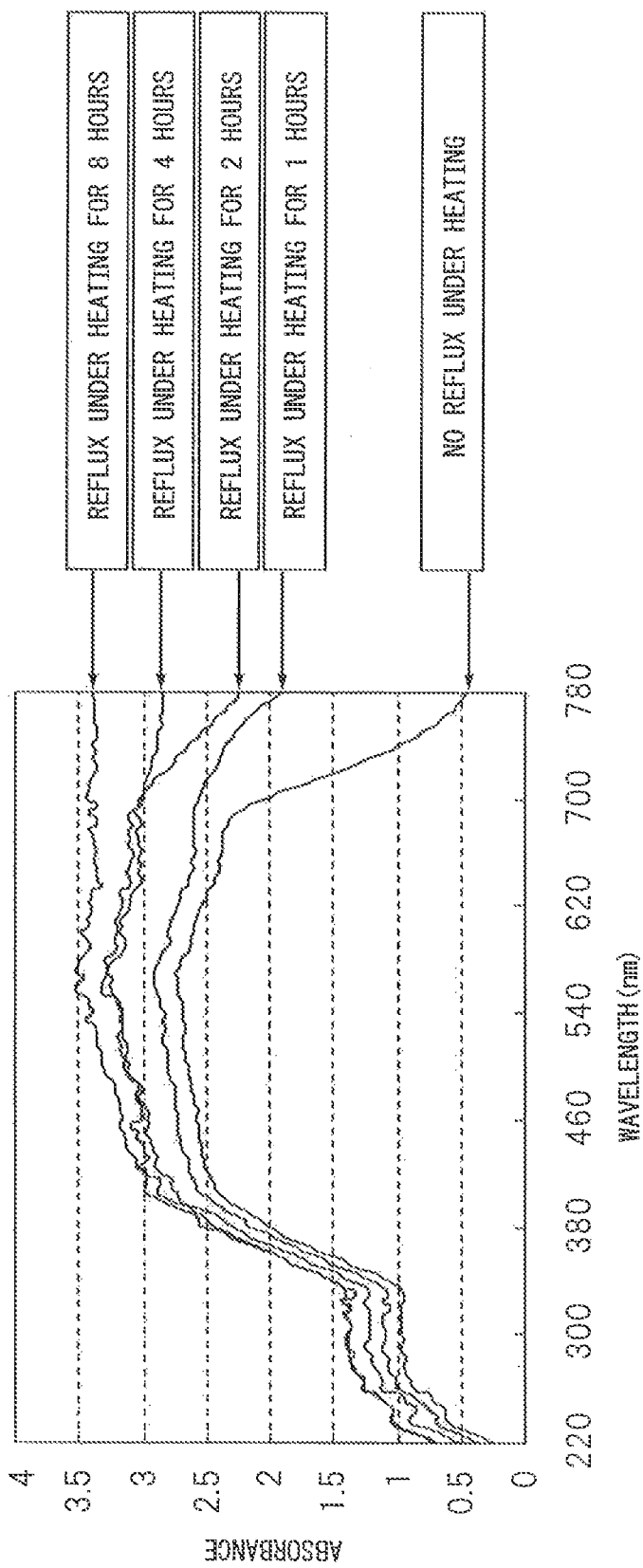
FIG. 12 is a view showing the relationship between the time for which reflux under heating is performed, and the absorbance of the platinum particle-containing solution (Reference Example 2).

The polyvinylpyrrolidone-platinum solution obtained as in Reference Example 1 and four kinds of platinum fine particle-containing solutions obtained by performing reflux under heating were measured for the absorbance at a wavelength of 220 to 780 nm. FIG. 12 shows the results. Incidentally, the absorbance is indicative of the degree of aggregation of platinum particles, and a high absorbance means that in the polyvinylpyrrolidone-platinum solution and the platinum fine particle-containing solutions, platinum forms a large aggregate and/or platinum forms a dense aggregate. The absorbance is the intensity of light absorption of a material represented by $\log_{10}(I_0/I)$ where $I_0$ is the incident light intensity and I is the transmitted light intensity.

The maximum absorbance of the polyvinylpyrrolidone-platinum solution obtained as in Reference Example 1 ("no reflux under heating") was about 2.7. The maximum absorbance of four kinds of platinum fine particle-containing solutions obtained by performing reflux under heating, i.e., by performing a reduction and aggregation treatment for 1 hours, 2 hours, 4 hours and 8 hours, was about 2.9, about 3.3, about 3.3 and about 3.5, respectively. It is understood from these results that reduction and aggregation of the platinum ion did not proceed completely by the reflux under heating at least up to 4 hours and reduction and aggregation of the platinum ion further proceeded by continuing the reflux under heating. That is, it is understood from these results that the platinum ion was only partially reduced and aggregated by the reflux under heating at least up to 4 hours.

Reference Example 3

Platinum was supported on a ceria support using a platinum fine particle-containing solution obtained by performing reflux under heating for 4 hours as in Reference Example 1, thereby obtaining Platinum-Supported Ceria Catalyst 3-1 (Pt/$CeO_2$). Further, Platinum-Supported Ceria Catalyst 3-2 (Pt/$CeO_2$) was obtained by supporting platinum on a ceria support powder in the same manner as in Reference Example 1, except for in place of the platinum fine particle-containing solution, directly using a diluted platinum solution obtained as in Reference Example 1, i.e., a diluted dinitrodiammine platinum nitrate ($[Pt(NO_2)_2(NH_3)_2]$) solution.

With respect to these exhaust gas purifying catalysts of the present invention and prior art, the particle diameter of platinum after endurance was determined by the carbon monoxide (CO) pulse adsorption method described below using an apparatus shown in FIG. 13.

Endurance Conditions:

Heated at 1,000° C. for 5 hours by switching the atmosphere between rich and lean atmospheres every two minutes.

Sample: 0.1 g

Carbon Monoxide Adsorption Conditions:

The exhaust gas purifying catalyst was oxidized in oxygen under heating at 400° C. for 20 minutes and then reduced in hydrogen under heating at 400° C. for 20 minutes, and thereafter carbon monoxide was adsorbed to the exhaust gas purifying catalyst at 0° C.

Figure 14:
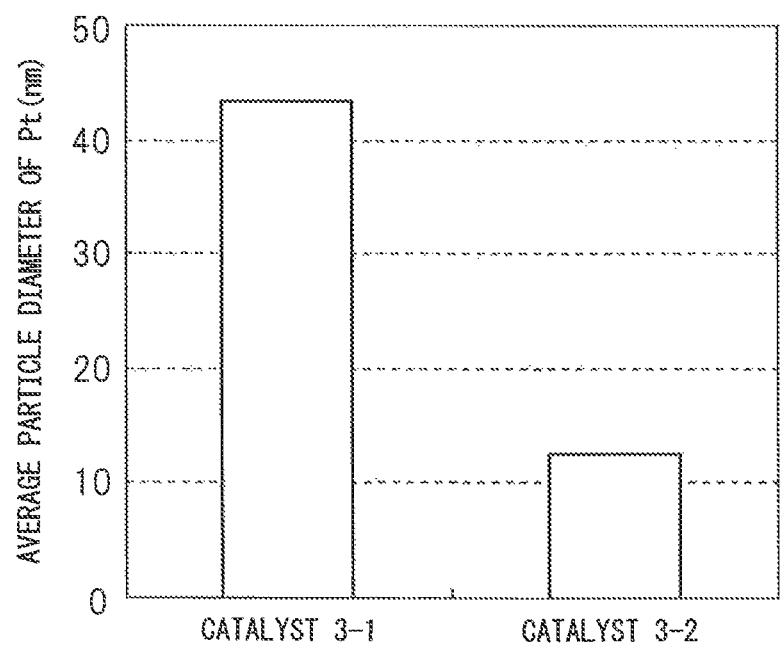
FIG. 14 is a view showing the average particle diameter of platinum after endurance (Reference Example 3).

FIG. 14 shows the measured particle diameter of platinum after endurance. As is clear from FIG. 14, in Exhaust Gas Purifying Catalyst 3-1, compared with Exhaust Gas Purifying Catalyst 3-2, a small platinum particle diameter can be maintained even after endurance.

Reference Example 4

Production of Exhaust Gas Purifying Catalyst 4-1

As in Reference Example 1, ion-exchanged water was added to a dinitrodiammine platinum nitrate ($[Pt(NO_2)_2(NH_3)_2]$) solution having a total platinum content of $4.50 \times 10^{-3}$ mol, and the solution was stirred to obtain 300 g of a diluted platinum solution. 300 g of ion-exchanged water was added to 2.52 g of polyvinylpyrrolidone (PVP) in a concentration of $2.25 \times 10^{-2}$ mol (5 times the molar number of platinum) in terms of monomer unit, and the polyvinylpyrrolidone was completely dissolved by stirring to prepare a uniform polyvinylpyrrolidone solution.

Thereafter, the diluted platinum solution was slowly added dropwise to and mixed with the polyvinylpyrrolidone solution, and the resulting mixture was stirred at room temperature for 1 hour. Then, ethanol was added to the mixture to give a mixing ratio of ion-exchanged water and ethanol of 20:80 (by mass), and the resulting mixture was stirred for 30 minutes to obtain a platinum-polyvinylpyrrolidone solution. The thus-obtained platinum-polyvinylpyrrolidone solution was refluxed under heating for 2 hours, thereby reducing and aggregating the platinum ion to obtain a platinum fine particle-containing solution. The thus-obtained platinum fine particle-containing solution is designated as Platinum Fine Particle-Containing Solution 4-1.

Platinum Fine Particle-Containing Solution 4-1 was added to 30 g of a ceria ($CeO_2$)-based oxide powder dispersed in distilled water as much as 6 times by weight, such that Pt accounts for 0.5 wt % based on the powder, and the resulting mixture was stirred for 1 hours. Thereafter, water was evaporated at 120° C., and the residue was fired at 450° C. for 2 hours and ground in a mortar to prepare a platinum-supported ceria catalyst. The thus-prepared platinum-supported ceria catalyst is designated as Exhaust Gas Purifying Catalyst 4-1. Exhaust Gas Purifying Catalyst 4-1 corresponds to the exhaust gas purifying catalyst obtained by performing the reflux under heating for 2 hours in Reference Example 1.

The production conditions and analysis results of Exhaust Gas Purifying Catalyst 4-1 are shown together in Table 2 below. The absorbance and the platinum particle diameter were measured as in Reference Examples 2 and 3, respectively.

<Production of Exhaust Gas Purifying Catalysts 4-2 to 4-8>

Exhaust Gas Purifying Catalysts 4-2 to 4-8 were obtained in the same manner as in Exhaust Gas Purifying Catalyst 4-1, except for changing the production conditions as shown in Table 1 below. The production conditions and analysis results of Exhaust Gas Purifying Catalysts 4-2 to 4-8 are shown together in Table 2 below.

TABLE 2

Production Conditions and Analysis Results of Platinum Fine Particle Solution

| | Production Conditions | | | | | Analysis Results | |
|---|---|---|---|---|---|---|---|
| | Platinum Solution | Polymer | PVP/Platinum (molar ratio*[1]) | Ion-Exchanged Water:Alcohol (by mass) | Alcohol Used | Absorbance | Platinum Particle Diameter (nm) |
| Catalyst 4-1 | dinitrodiammine nitrate solution | PVP | 5 | 20:80 | ethanol | 3.0 | 1.3 |
| Catalyst 4-2 | dinitrodiammine nitrate solution | PVP | 5 | 20:80 | 1-propanol | 3.1 | 1.2 |
| Catalyst 4-3 | dinitrodiammine nitrate solution | PVP | 5 | 80:20 | 1-propanol | 3.0 | 0.8 |
| Catalyst 4-4 | dinitrodiammine nitrate solution | PVP | 50 | 80:20 | 1-propanol | 3.0 | 0.7 |
| Catalyst 4-5 | chloroplatinic acid solution | PVP | 5 | 20:80 | 1-propanol | 2.9 | 1.8 |
| Catalyst 4-6 | chloroplatinic acid solution | PVP | 5 | 20:80 | ethanol | 3.2 | 2.4 |
| Catalyst 4-7 | chloroplatinic acid solution | PVP | 5 | 20:80 | methanol | 3.1 | 3.6 |
| Catalyst 4-8 | chloroplatinic acid solution | PVP | 5 | 10:90 | methanol | 3.2 | 4.8 |

*[1]PVP (polyvinylpyrrolidone) is in terms of monomer unit.

<Evaluation>

Each of Exhaust Gas Purifying Catalysts 4-1 to 4-8 was formed into a pellet and evaluated as follows for the hydrocarbon (HC) 50% purification temperature (the temperature at which the HC purification ratio becomes 50%) by using an apparatus shown in FIG. 13.

Figure 15:
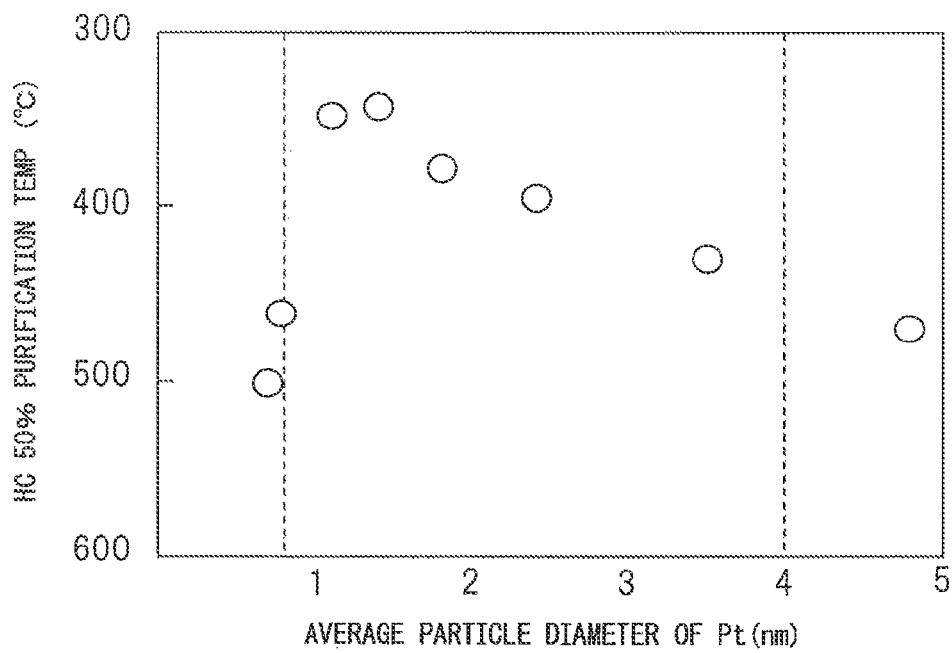
FIG. 15 is a view showing the relationship between the average particle diameter of platinum and the hydrocarbon (HC) 50% purification temperature (Reference Example 4).

Total gas flow rate: 15 L/min
Gas Composition:
$C_3H_6$-1,000 ppm or 3,000 ppmC, CO—6,500 ppm, NO—1,500 ppm, $O_2$-7,000 ppm, $CO_2$-10%, $H_2O$-none, $N_2$-balance.
Temperature Conditions:
Lowered from 600° C. to 100° C. (temperature drop rate: 20° C./min).
Amount of Exhaust Gas Purifying Catalyst: 3.0 g FIG. 15 shows the evaluation results. It is understood from FIG. 15 that when the average particle diameter of platinum is 0.8 to 4 nm (corresponding to a particle having a platinum atom number of 9 to 1,140), the HC 50% purification temperature is low, i.e., the activity of the exhaust gas purifying catalyst is high. This is believed to be due to the reason that when the particle diameter of platinum is too small, platinum is present in a state close to an oxide and when the particle diameter of platinum is too large, the surface area of platinum, which is an active site of the reaction, is reduced.

Reference Example 5

Exhaust Gas Purifying Catalysts 5-1 and 5-2 were obtained in the same manner as in Exhaust Gas Purifying Catalysts 4-1 and 4-4 in Reference Example 4. The average platinum particle diameters of Exhaust Gas Purifying Catalysts 5-1 and 5-2 were 1.4 nm and 0.7 nm, respectively.

Figure 16:
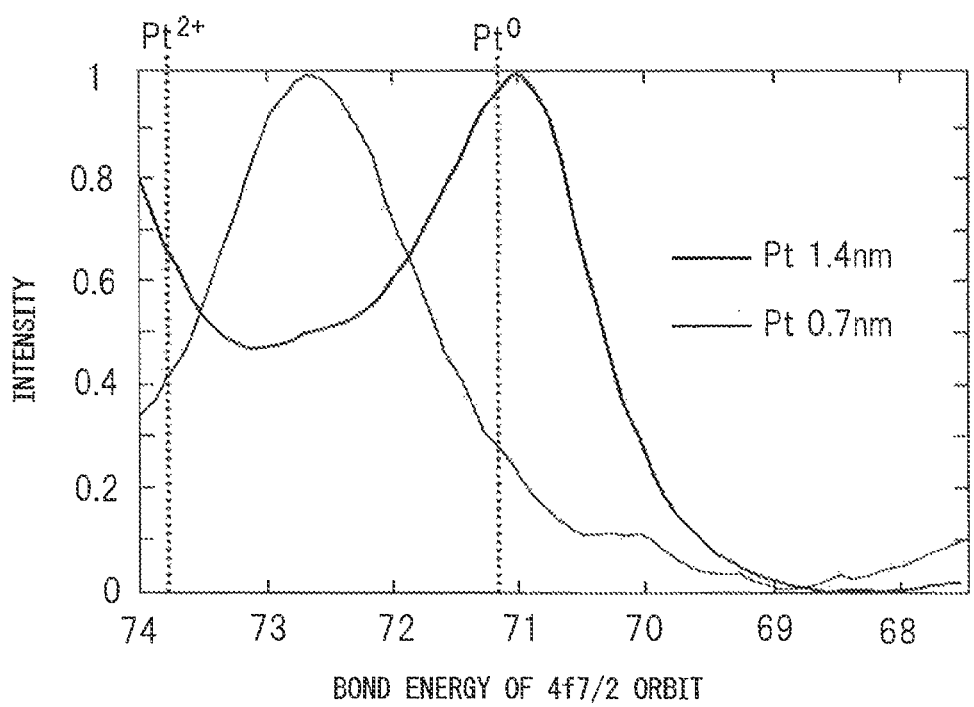
FIG. 16 is a view showing the relationship between the particle diameter of platinum and the oxidation state (Reference Example 5).

With respect to Exhaust Gas Purifying Catalysts 5-1 and 5-2 obtained in this way, the oxidization state of platinum in Exhaust Gas Purifying Catalyst 5-1 (average platinum particle diameter: 1.4 nm) and Exhaust Gas Purifying Catalyst 5-2 (average platinum particle diameter: 0.7 nm) was evaluated from the bond energy of 4f7/2 orbit by using X-ray photoelectron spectroscopic (XPS) analysis. FIG. 16 shows the results. It is understood from FIG. 16 that in Exhaust Gas Purifying Catalyst 5-1 (average platinum particle diameter: 1.4 nm), platinum is in a relatively metallic state ($Pt^0$), whereas in Exhaust Gas Purifying Catalyst 5-2 (average platinum particle diameter: 0.7 nm), platinum is in a relatively oxide-like state ($Pt^{2+}$).

DESCRIPTION OF REFERENCE NUMERALS 10, 10a, 10b, 10c: Exhaust gas purifying catalyst
11: Support
12, 12a, 12b, 12c: Noble metal particle
W: Width of the portion of contact between support and noble metal particle
H: Height of noble metal particle from the surface of support
31, 32, 33: Noble metal particle
35: Support
70: Testing apparatus used in Reference Examples 3 and 4

The invention claimed is:

1. A process for producing an exhaust gas purifying catalyst, comprising:
   masking, in a solution, at least a part of the surface of a crystalline metal oxide support by a masking agent,
   introducing said support with at least a part of the surface being masked by a masking agent, into a noble metal-containing solution containing a noble metal, and
   drying and firing said support and said noble metal-containing solution to support said noble metal on said support,
   wherein said masking agent has a functional group selected from the group consisting of a secondary amine group, a tertiary amine group, a carboxyl group, a hydroxyl group, a carbonyl group and a combination thereof.

2. The process as claimed in claim 1, wherein said noble metal-containing solution is a noble metal aggregate-containing solution containing a partially reduced and aggregated noble metal aggregate, and
   wherein said noble metal aggregate-containing solution is obtained by providing a raw material solution containing a noble metal ion and/or complex and a polymer, coordinating said noble metal ion and/or complex to said polymer, and partially reducing and aggregating said noble metal ion and/or complex coordinated to said polymer.

3. The process as claimed in claim 2, wherein said partial reduction and aggregation are performed by heating, addition of a reducing agent, or a combination thereof.

4. The process as claimed in claim 2, wherein said polymer has a functional group selected from the group consisting of a secondary amine group, a tertiary amine group, a carboxyl group, a hydroxyl group, a carbonyl group and a combination thereof.

5. The process as claimed in claim 1, wherein said noble metal is selected from the group consisting of platinum, palladium, rhodium and a combination thereof.

6. The process as claimed in claim 1, wherein said support is a metal oxide support containing a metal element selected from the group consisting of an alkali metal, an alkaline earth metal, a rare earth and a combination thereof.

* * * * *